US010970460B2

(12) United States Patent
Ogawara

(10) Patent No.: US 10,970,460 B2
(45) Date of Patent: Apr. 6, 2021

(54) INFORMATION PROCESSING APPARATUS, METHOD OF DISPLAYING IMAGE, STORAGE MEDIUM, AND SYSTEM

(71) Applicant: Ricoh Company, Ltd., Tokyo (JP)

(72) Inventor: Osamu Ogawara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 52 days.

(21) Appl. No.: 15/846,920

(22) Filed: Dec. 19, 2017

(65) Prior Publication Data
US 2018/0173679 A1 Jun. 21, 2018

(30) Foreign Application Priority Data
Dec. 19, 2016 (JP) .............................. JP2016-245863

(51) Int. Cl.
*G06F 17/21* (2006.01)
*G06T 19/00* (2011.01)
*G06F 40/106* (2020.01)
*G06F 3/0484* (2013.01)
*H04N 5/232* (2006.01)
(Continued)

(52) U.S. Cl.
CPC ........ *G06F 40/106* (2020.01); *G06F 3/04845* (2013.01); *G06T 19/003* (2013.01); *H04N 5/2258* (2013.01); *H04N 5/23238* (2013.01); *H04N 5/23293* (2013.01); *H04N 13/117* (2018.05); *H04N 21/41407* (2013.01); *H04N 21/4312* (2013.01); *H04N 21/4728* (2013.01); *H04N 21/4858* (2013.01); *H04N 21/812* (2013.01); *H04N 21/8586* (2013.01); *G06T 2200/24* (2013.01)

(58) Field of Classification Search
CPC .............. G06F 3/04845; G06T 19/003; G06T 2200/24
See application file for complete search history.

(56) References Cited

U.S. PATENT DOCUMENTS

| 8,428,873 B2* | 4/2013 | Chau ................. G01C 21/3647 701/400 |
| 2002/0135621 A1* | 9/2002 | Angiulo ................ G06F 16/958 715/838 |

(Continued)

FOREIGN PATENT DOCUMENTS

| JP | 2009-146235 | 7/2009 |
| JP | 2015-154165 A | 8/2015 |
| JP | 2015-210510 A | 11/2015 |

OTHER PUBLICATIONS

Office Action dated Jul. 14, 2020 in Japanese Patent Application No. 2016-245863, 3 pages.

*Primary Examiner* — Tan H Tran
(74) *Attorney, Agent, or Firm* — Xsensus LLP

(57) ABSTRACT

An information processing apparatus includes circuitry to receive a signal indicating that a user operation is performed on a screen having a first region including an image and a second region, the screen being displayed on a display, update a display status of the screen based on the received signal corresponding to the user operation performed on the screen, determine whether the user operation is performed on the first region or the second region, and change a presentation style of the image in the screen displayed on the display based on a determination that the user operation is performed on the second region.

20 Claims, 19 Drawing Sheets

(51) Int. Cl.
*H04N 5/225* (2006.01)
*H04N 13/117* (2018.01)
*H04N 21/414* (2011.01)
*H04N 21/4728* (2011.01)
*H04N 21/431* (2011.01)
*H04N 21/858* (2011.01)
*H04N 21/485* (2011.01)
*H04N 21/81* (2011.01)

(56) References Cited

U.S. PATENT DOCUMENTS

| | | | |
|---|---|---|---|
| 2007/0174774 A1* | 7/2007 | Lerman | G11B 27/034 |
| | | | 715/723 |
| 2010/0315435 A1* | 12/2010 | Ishida | G06F 3/1415 |
| | | | 345/634 |
| 2017/0052752 A1 | 2/2017 | Ogawara | |
| 2017/0064214 A1* | 3/2017 | Zhang | G06K 9/00912 |
| 2017/0078654 A1* | 3/2017 | Facin | G06F 3/04815 |
| 2017/0131872 A1* | 5/2017 | Husain | G06F 16/904 |
| 2017/0213389 A1* | 7/2017 | Han | H04N 5/44591 |
| 2017/0308553 A1* | 10/2017 | Xu | G06F 16/54 |
| 2017/0357402 A1* | 12/2017 | Wolters | G01B 21/16 |

* cited by examiner

```
<script src="http://abcdef.com/js/adgscriptloader.js?id=12345"></script>
```

HEMISPHERICAL IMAGE (FRONT SIDE)

HEMISPHERICAL IMAGE (REAR SIDE)

MERCATOR IMAGE

FULL VIEW SPHERICAL IMAGE

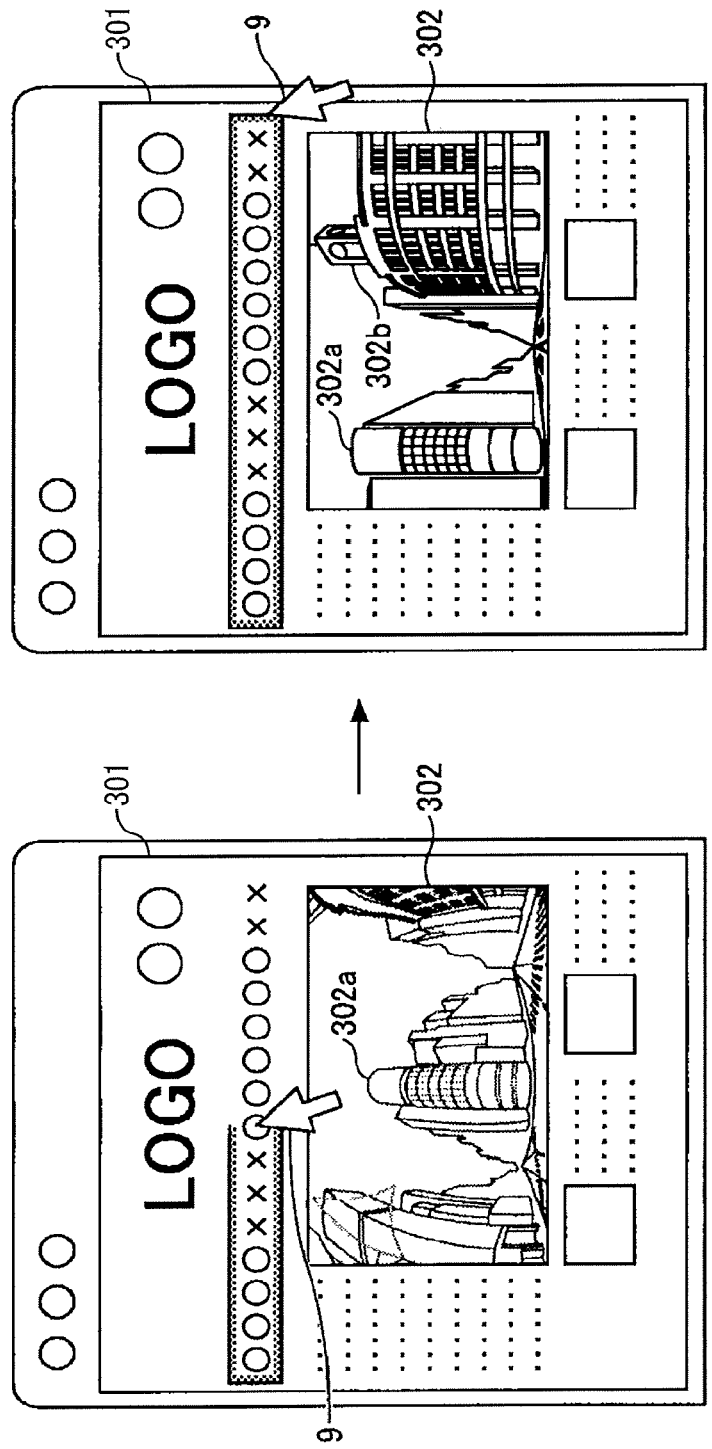

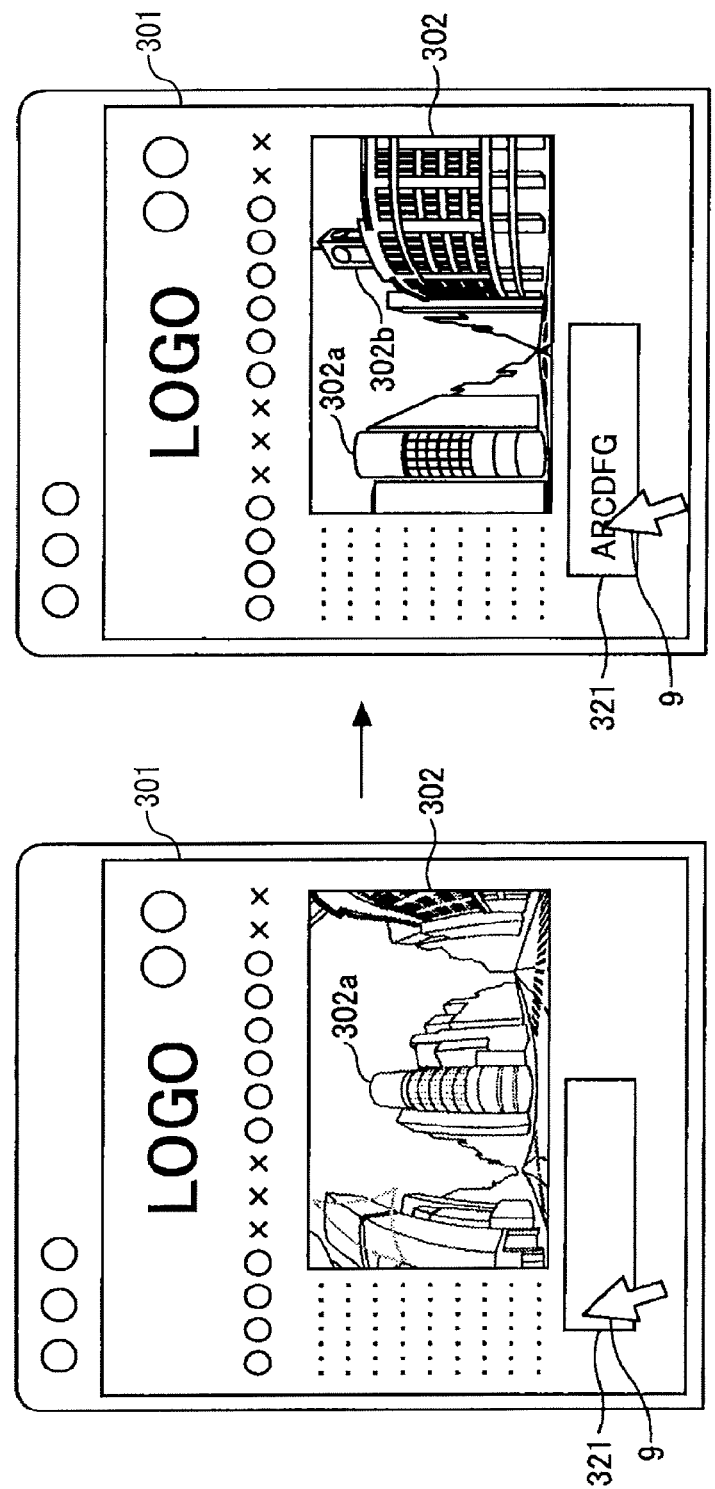

INFORMATION PROCESSING APPARATUS, METHOD OF DISPLAYING IMAGE, STORAGE MEDIUM, AND SYSTEM

CROSS-REFERENCE TO RELATED APPLICATION

This application claims priority pursuant to 35 U.S.C. § 119(a) to Japanese Patent Application No. 2016-245863, filed on Dec. 19, 2016, in the Japan Patent Office, the disclosure of which is incorporated by reference herein in its entirety.

BACKGROUND

Technical Field

This disclosure relates to an information processing apparatus, a method of displaying image, a storage medium, and a system.

Background Art

Conventionally, Web servers provide screen data to be used for displaying various images to information processing apparatuses. A user such as a viewer person can see the various images by operating browser software installed on such information processing apparatus.

In some cases, images displayed with the browser software can be utilized for advertisement. For example, a Web page distributed by the Web server includes an advertisement space, and a target image used for advertisement is displayed in the advertisement space when the Web page is displayed on a display. When the viewer person clicks the advertisement (i.e., the target image) in the advertisement space displayed on the display, the information processing apparatus communicates with the Web server, which is a link destination set in the advertisement, and then displays detailed information related to the advertisement acquired from the Web server on the display.

SUMMARY

As one aspect of the present invention, an information processing apparatus is devised. The information processing apparatus includes circuitry to receive a signal indicating that a user operation is performed on a screen having a first region including an image and a second region, the screen being displayed on a display, update a display status of the screen based on the received signal corresponding to the user operation performed on the screen, determine whether the user operation is performed on the first region or on the second region, and change a presentation style of the image in the screen displayed on the display based on a determination that the user operation is performed on the second region.

As another aspect of the present invention, a method of displaying an image is devised. The method includes displaying a screen including a first region in which an image is displayed, and a second region, in response to a user operation performed on the screen, determining whether the user operation is for the first region or the second region, and updating the screen according to the user operation while causing the image in the first region to reflect the user operation, based on a determination that the user operation is for the second region.

As another aspect of the present invention, a non-transitory storage medium storing one or more instructions that, when executed by one or more processors, cause the one or more processors to execute a method of displaying an image is devised. The method includes displaying a screen including a first region in which an image is displayed, and a second region, in response to a user operation performed on the screen, determining whether the user operation is for the first region or the second region, and updating the screen according to the user operation while causing the image in the first region to reflect the user operation, based on a determination that the user operation is for the second region.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 15B illustrates an example of a full view spherical image when a presentation style of a full view spherical image is changed by a dragging operation on a Web page;

FIG. 15C illustrates an example of a full view spherical image when a presentation style of a full view spherical image is changed by inputting characters to a Web page;

Figure 1A:
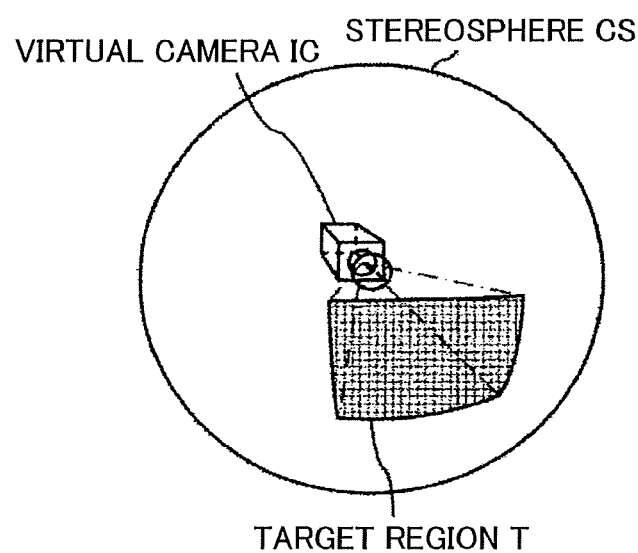
FIG. 1A illustrates an example of a full-view spherical image represented by a three dimensional stereosphere.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description of one or more embodiments of the present invention is given with reference to the accompanying drawings.

(Outline of Browsing System)

Figure 1B:
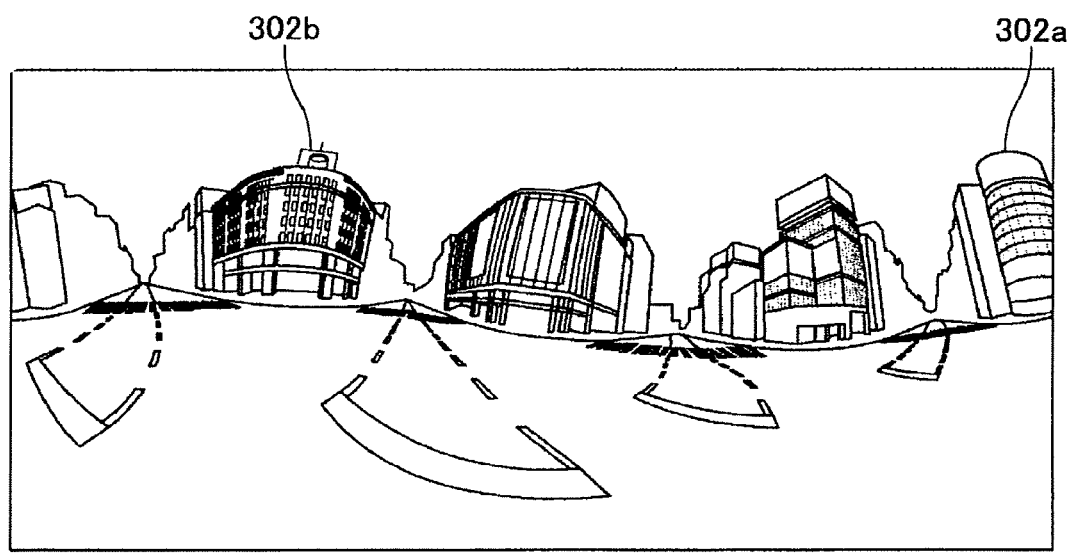
FIG. 1B illustrates a full-view spherical image represented by Mercator projection.

FIG. 1 illustrates a scheme of a wide angle image such as a full-view spherical image. In this description, the wide angle image such as the full-view spherical image is described as an example of the image that can change its presentation style depending on a user operation to be described later. For distinguishing the image that can change its presentation style from other images, the image may also referred to as the presentation image. FIG. 1A illustrates an example of a spherical image expressed by a three dimensional stereosphere CS. FIG. 1B illustrates a full-view spherical image expressed by Mercator projection. The full-view spherical image generated by a full-view spherical camera has a three dimensional structure that the image illustrated in FIG. 1B is projected on the stereosphere CS. In this configuration, a virtual camera IC corresponds to a view point of a viewer person, and the view point of the viewer person is set at the center of the full-view spherical image in FIG. 1. When the viewer person rotates the virtual camera IC about the three axes such as the X axis, the Y axis and the Z axis passing through the virtual camera IC, a target region T in the full-view spherical image can be displayed on a display. In this disclosure, the target region T is a region displayed on the display in a manner that is viewable by the viewer person.

FIG. 2 illustrates an example that the target region T is displayed as a planar image by using browser software 301, in which a region image 302 corresponds to the target region T.

The information processing apparatus 10 processes information used for configuring a screen image, acquired from a server, to display a screen image including the region image 302, which corresponds to the target region T in a full view spherical image, using the browser software 301. Hereinafter, the information used for configuring the screen image is simply referred to as screen-configuring information. The screen-configuring information includes, for example, data described in hypertext markup language (HTML). In this description, the screen image may be any image or data that are displayed on a display area, provided by the information processing apparatus 10, for display to the viewer person. For the descriptive purposes, the screen image may be simply referred to as the screen. Further, in this description, it is assumed that the screen is configured with a first region including the presentation image (e.g., region image 302, or the spherical image) and a second region other than the first region.

Further, the screen-configuring information includes a display program used for displaying the target region T in the full view spherical image when a user such as a viewer person performs a user operation on the screen.

When the viewer person places a mouse cursor by operating such as a mouse or directly places a finger on the region image 302, and moves the cursor or finger over the region image 302, a gaze point (i.e., a center of target region T) of the spherical image is changed, causing the change in the target region T for display. The position on the Web page where the cursor is displayed or touched by the finger are just examples of a coordinate on the Web page that receives a user operation. For simplicity, such position is referred to as the cursor 9, in this embodiment. Further, any pointer used for selecting such position, such as a mouse or a finger, is collectively referred to as an operable unit. With movement of the cursor 9, the region image 302, which corresponds to the target region T of the spherical image, can be enlarged or reduced in size.

Further, in the embodiment, in response to detection of a user operation on the second region by the viewer person, such as a Web page, while the cursor 9 is not overlapped on the first region such as the region image 302, the information processing apparatus 10 changes a presentation style of the full view spherical image displayed on the Web page depending on the user operation by the viewer person. For example, when the viewer person performs a scroll operation on the Web page while the cursor 9 is not overlapped on the region image 302, the information processing apparatus 10 executes the display program to rotate the full view spherical image horizontally, with which the target region T displayed on the display such as a monitor can be changed, in which the change of the target region T displayed on the display corresponds to the change of the presentation style of the full view spherical image, which is an example of the presentation image. In the embodiment, when the viewer person performs the user operation on the Web page, the presentation style of the image such as the full view spherical image can be changed. That is, the user operation on the Web page causes or triggers a change in the presentation style of the image such as the full view spherical image.

Figure 2A:
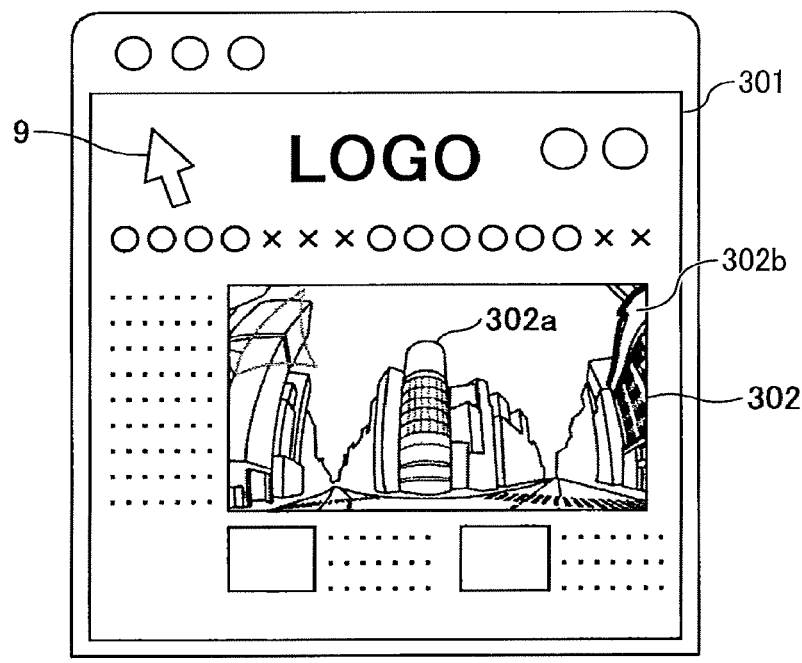
FIGS. 2A and 2B each illustrate an example of a region image displayed on a display by using browser software.
Figure 2B:
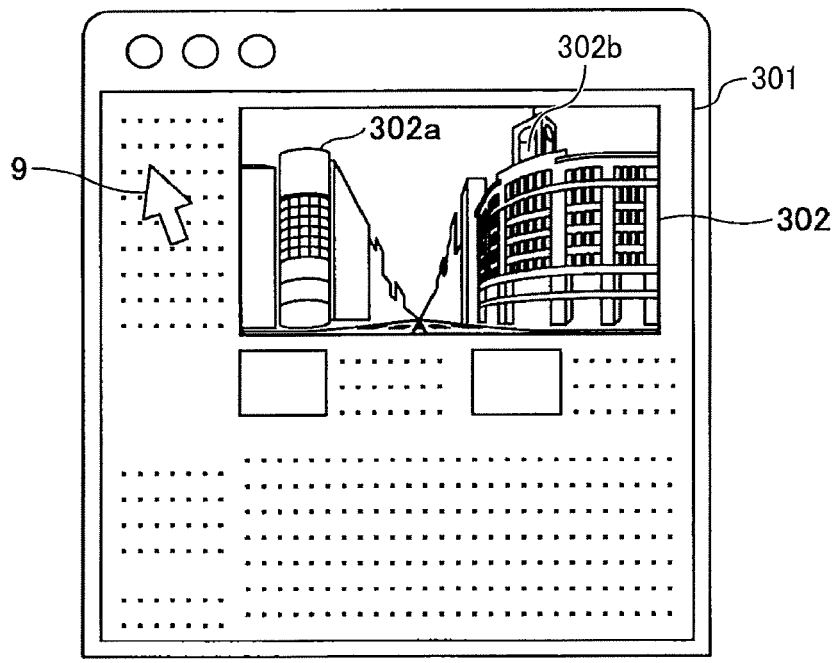

In an example case of FIG. 2A, a first building 302a is displayed at the center of the region image 302. When the viewer person scrolls down a Web page (FIG. 2A), as illustrated in FIG. 2B, the region image 302 moves upward. Hereinafter, the browser software 301 may be simply referred to as the browser 301. Further, the scroll operation performed on the Web page causes or triggers a change in the presentation style of the full view spherical image. In this example case, the first building 302a displayed at the center in the region image 302 in FIG. 2A is moved to the left end in the region image 302 illustrated in FIG. 2B, and a second building 302b, which is merely displayed in the region image 302 in FIG. 2A, is displayed in the region image 302 as illustrated in FIG. 2B. When the viewer person scrolls the Web page, the full view spherical image is rotated to the left along the horizontal direction, such that the viewer person can instantly recognize the existence of the spherical image. That is, the user operation such as the scroll operation on the Web page causes or triggers the change in the presentation style of the full view spherical image.

In this configuration, the full view spherical image rotates by the scroll operation on the Web page by the viewer person. Since a movement not intended by the viewer person occurs in the region image 302 on the Web page, a gaze direction of the viewer person can be easily guided to the region image 302.

Since the region image 302, which corresponds to the target region T of the full view spherical image, is displayed on the Web page as a still planar image, the viewer person cannot distinguish between a normal image having a normal angle of view and the full view spherical image having a wide angle of view. Since the spherical image is, for example, a landscape image of 360 degrees as described above, the spherical image has information that is not displayed in the region image 302. Therefore, if the viewer person does not recognize that the full view spherical image is displayed, the full view spherical image cannot be utilized effectively.

The full view spherical image can be utilized, for example, in a Web advertisement or Internet advertisement. For example, a real estate agent creates a Web page displaying a full view spherical image of interior of a condominium captured by a full view spherical camera to promote sales of condominium. With the cursor 9 on the full view spherical image displayed on the Web page, the viewer person can freely change a gaze point of the displayed full view spherical image, or enlarge or reduce a size of the view spherical image. Since the viewer person can see interior design inside the condominium that cannot be seen by a normal image having a normal angle of view, the viewer person is able to have more information without physically visiting the condominium. Accordingly, the condominium can be sold with a higher probability and the number of visiting to the condominium can be reduced. However, if the viewer person does not recognize that the region image 302 on the Web page is the spherical image, the advertising effect may be decreased. When the presentation image such as the full-view spherical image is displayed in the region 302 on the Web page, the region 302 displays a portion of the presentation image, in which the viewer person may not recognize that the region image 302 is displaying a portion of the presentation image even though the presentation image has other portions not displayed in the region image 302 because the region image 302 displayed on the Web page is seen like a still image that does not change.

In the embodiment, the presentation style of the full view spherical image is changed in response to a user operation on the Web page by a user such as the viewer person, with which the viewer person can recognize the full view spherical image with a higher probability.

(System Configuration)

Figure 3:
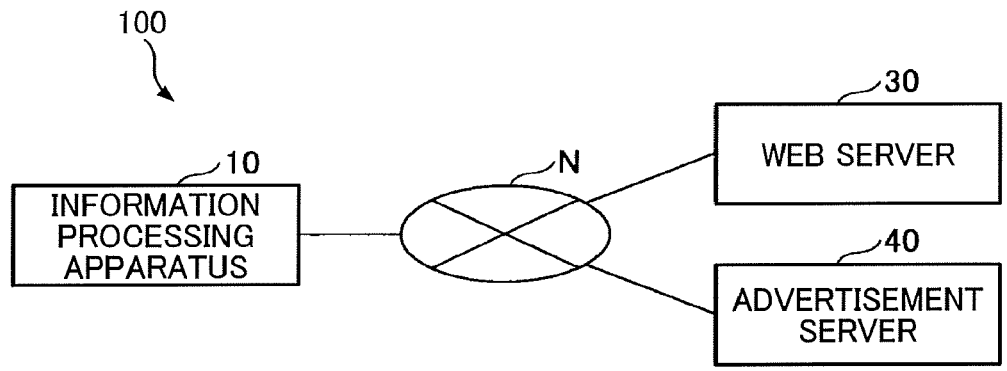
FIG. 3 is a schematic diagram illustrating an example network configuration of a browsing system.

FIG. 3 illustrates an example of a schematic configuration of a browsing system 100. The browsing system 100 includes, for example, an information processing apparatus 10, a Web server 30 (as a first server), and an advertisement server 40 (as a second server), which can communicate with each other via a network N.

The network N can be configured by, for example, a local area network (LAN) that is built in a facility where the information processing apparatus 10 is disposed, a provider network to connect the LAN to the Internet, and a communication line provided by a line operator. When the network N includes a plurality of LANs, the network N is referred to as a wide area network (WAN) or the Internet. The network N can be configured wirelessly or by wire, and by a combination of wired and wireless communication. Further, when the information processing apparatus 10 is directly connected to a public line network, the information processing apparatus 10 can be connected to the provider network directly without the LAN.

In the embodiment, the information processing apparatus 10 is used as a client terminal or user terminal. The information processing apparatus 10 is installed with the browser software 301 or any other application software having functions equivalent to the browser software 301. When the information processing apparatus 10 requests the Web server 30 for a Web page, and then receives the Web page from the Web server 30, the information processing apparatus 10 displays the received Web page on a display by executing the browser software 301 or the other application software. It should be noted that the information processing apparatus 10 and the display can be integrated as one apparatus, or the information processing apparatus 10 and the display can be disposed as individual or separate apparatuses connected with each other wirelessly and/or by wire.

For example, the information processing apparatus 10 employs a personal computer (PC), a tablet device, a smart phone, a personal digital assistant (PDA), a game machine, and a wearable PC, each having the display that can display advertisements in the form of an image such as a Web page. For example, if a printer has a function of displaying a Web page or a display that displays the Web page, the printer can be used as the information processing apparatus 10.

Further, a digital signage can be used to display the Web page. The digital signage means a system or a display device using an electronic display device such as a display panel used for displaying information at places or locations where people gather such as outdoors, shops, public spaces, and transportation facilities, and the digital signage may also mean information displayed on the display.

The information processing apparatus 10, can be connected with the network N via an access point of a wired LAN or a wireless LAN, and can be connected to the network N by using communication standards of circuit switching type such as 3G, 4G and long term evolution (LTE).

The Web server 30 is a general information processing apparatus such as a computer that provides information and functions through the network to the client computer such as the information processing apparatus 10 used by a user, and a software running on the computer. As to the Web server 30 and the information processing apparatus 10, when the information processing apparatus 10 transmits a request to the Web server 30, the Web server 30 transmits screen-configuring information to the information processing apparatus 10 as a response to the request from the information processing apparatus 10 by using HTTP or hypertext transfer protocol secure (HTTPs). The screen-configuring information is, for example, a set of information described by using hypertext markup language (HTML), script language, and cascading style sheet (CSS).

Specifically, a structure of the Web page is described by the HTML, an operation on the Web page is described by the script language, and a style of the Web page is described by the CSS. In the embodiment, the user operation on the Web page by the viewer person that affects a full view spherical image is described in the script language. The script language employs known program languages such as JavaScript (registered trademark) or ECMAScript.

In the embodiment, it is assumed that a Web page includes a Web application. The definition of a Web application means, for example, a process that the Web server 30 dynamically configures a Web page in response to a request from the viewer person, and a process that the Web page is operated by using the script language. For example, in a case that the Web server 30 dynamically configures the Web page, the Web server 30 configures the Web page arranged with pictures of condominiums matched to a search condition input by the viewer person, and in a case that the Web page is operated by using the script language, a full view spherical image is rotated in response to a user operation by the viewer person.

The advertisement server 40 is a general information processing apparatus used for distributing advertisement. The advertisement server 40 can also be referred to as another Web server. The advertisement server 40 and the information processing apparatus 10 communicate with each other by using HTTP or HTTPs.

Typically, an operator (such as a service provider) of the Web server 30 sells advertisement spaces, and advertisers purchase the advertisement spaces in an auction. The advertiser that has purchased an advertisement space registers information items such as banners and text, and advertisement image data (hereinafter referred to as advertisement information) in the advertisement server 40 by associating the advertisement information and the purchased advertisement space. Further, the operator of the Web server 30 sets a description such as an advertisement tag, to be described later, as a description corresponding to the advertisement space of HTML. The advertisement tag is reported to the Web server 30 from the advertisement server 40. The advertisement tag is, for example, uniform resource locator (URL) or the like that the information processing apparatus 10 uses for identifying the advertisement information registered in the advertisement server 40.

Since the advertisement space is associated with the advertisement information in the advertisement server 40, when the HTML that the information processing apparatus 10 has received from the Web server 30 has an advertisement space, the information processing apparatus 10 transmits a request for acquiring the advertisement information to the advertisement server 40 by referencing the advertisement tag. When the advertisement server 40 receives the request from the information processing apparatus 10, the advertisement server 40 distributes the advertisement information to the information processing apparatus 10.

The advertisement information can be a banner generated from characters, photographs, and pictures, and the advertisement information may include the script language in addition to image data. In the embodiment, since a user operation on the Web page by the viewer person causes a change in the presentation style of the full view spherical image, the advertisement information includes a program described by the script language such as the above described display program.

When an advertisement is clicked, information indicating that the advertisement is clicked is written in the Cookie of the browser software 301 installed in the information processing apparatus 10 used by the viewer person, and then transmitted to the advertisement server 40. Since information identifying the advertisement space is included in the Cookie, when the viewer person has accessed a Web site of an advertiser by using the Cookie, the advertisement server 40 can recognize that the viewer person using the information processing apparatus 10 has accessed the advertisement server 40 via the advertisement space of the Web server 30. Then, an operator (such as the agent) of the advertisement server 40 collects a predetermined fee from the advertiser, and pays a fee matched to the number of clicks to the operator of the Web server 30.

(Hardware Configuration)

Figure 4:
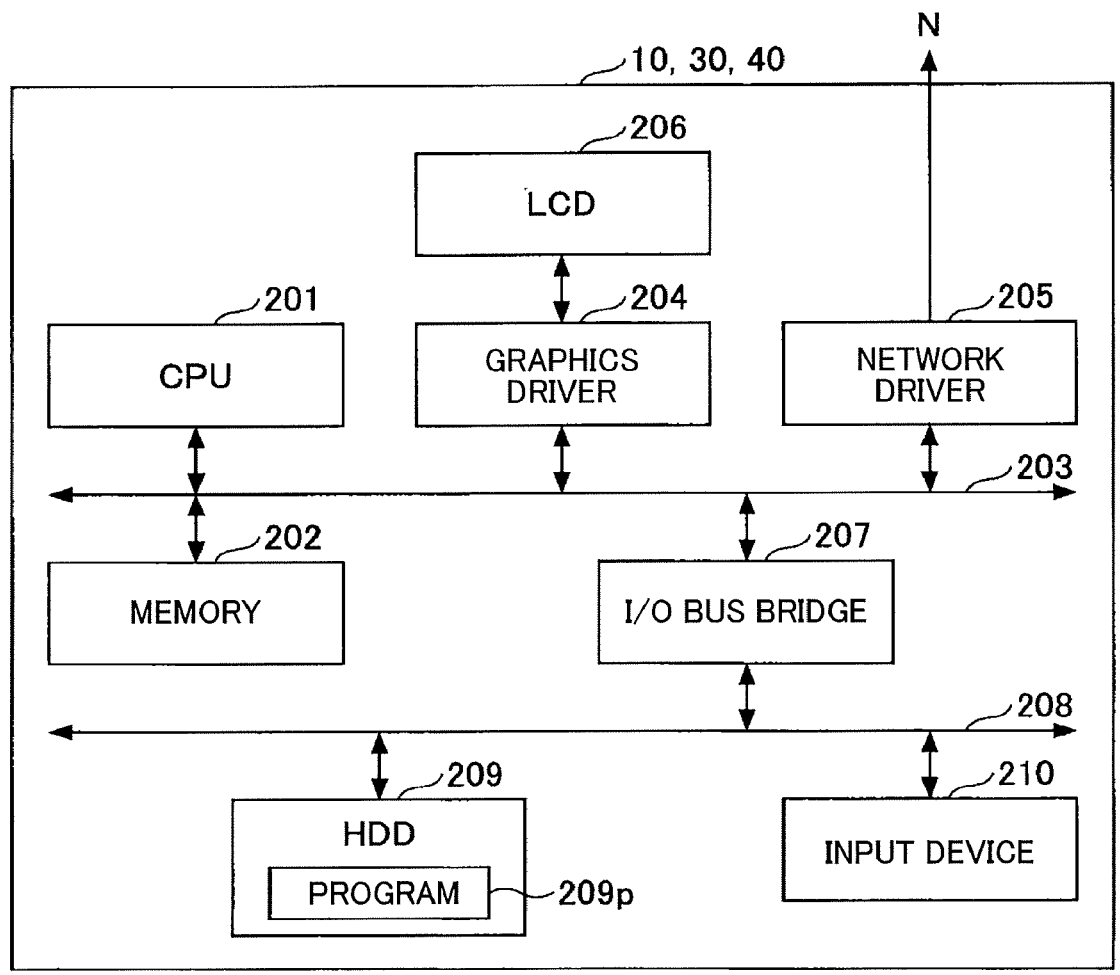
FIG. 4 schematically illustrates a hardware block diagram of an information processing apparatus.

FIG. 4 schematically illustrates a hardware block diagram of the information processing apparatus 10. The information processing apparatus 10 can be implemented by a personal computer, a workstation, or an appliance server, but not limited thereto. The information processing apparatus 10 includes, for example, a central processing unit (CPU) 201, and a memory 202 enabling high-speed access of data by the CPU 201. The CPU 201 and the memory 202 are connected to other device or other driver in the information processing apparatus 10 via a system bus 203. For example, the CPU 201 and the memory 202 are connected to a graphics driver 204, and a network driver 205 such as a network interface controller (NIC).

The graphics driver 204 is connected to a liquid crystal display (LCD) 206 via a bus, and the graphics driver 204 monitors processing results processed by the CPU 201. The LCD 206 is an example of a display. Further, a touch panel can be integrally disposed on the LCD 206, in which a user such as viewer person can operate the information processing apparatus 10 using a finger as the operable unit on the LCD 206. Further, the LCD 206 can include a sensor that detects the user operation caused by the operable unit such as the finger on the screen, and outputs a signal corresponding to the detected user operation caused by the operable unit. The sensor can employ any desired touch sensor such as a wire resistive sensor, surface capacitive sensor, projected capacitive sensor, surface acoustic wave sensor and infrared sensor, but not limited thereto.

Further, the network driver 205 establishes a connection with the network N at the transport layer level and the physical layer level, and establishes a session with the Web server 30 and/or the advertisement server 40.

The system bus 203 is further connected to an input/output (I/O) bus bridge 207. A storage unit such as a hard disk drive (HDD) 209 or the like is connected to the I/O bus bridge 207 using integrated drive electronics (IDE), advanced technology attachment (ATA), AT attachment packet interface (ATAPI), serial ATA, small computer system interface (SCSI), universal serial bus (USB) via an I/O bus 208 such as peripheral component interconnect (PCI)

bus. Further, instead of the HDD 209, a solid state drive (SSD) can be used, or a combination of the HDD 209 and the SSD can be used.

The HDD 209 stores a program 209p used for controlling the information processing apparatus 10 entirely. The program 209p includes the browser software 301 and screen-configuring information transmitted from the Web server 30. When the information processing apparatus 10 executes the browser software 301 and the display program included in the screen-configuring information, a user operation on the Web page causes a change in the presentation style in the region image 302. The program 209p can be distributed from the Web server 30, or can be distributed by a portable storage medium storing the program 209p such as a USB memory or an optical storage medium.

The I/O bus 208 is connected to an input device 210 such as a keyboard and a mouse (i.e., pointing device) via a bus such as USB, and receives inputs of information and instruction by an operator such as a system administrator. The input device 210 is an example of the operable unit.

The hardware configuration of the Web server 30 and the advertisement server 40 are substantially the same as the configuration of FIG. 4. However, it is preferable that the Web server 30 and the advertisement server 40 are compatible with the cloud computing. The cloud computing means a plurality of resources such as hardware resources on the network are used collectively, cooperatively, and collaboratively. When the cloud computing is used, the hardware configuration illustrated in FIG. 4 is not required to be disposed in one casing or one apparatus, but a plurality of devices illustrated in the hardware configuration of FIG. 4 can be disposed in different apparatuses while configuring the Web server 30 and the advertisement server 40 as a whole. Further, when the cloud computing is used, the physical configuration of the Web server 30 and the advertisement server 40 of the embodiment can be variably changed, in which the Web server 30 and the advertisement server 40 can be configured by dynamically connecting and disconnecting hardware resources depending on the processing load or the like.

(Function of Apparatus)

Figure 5:
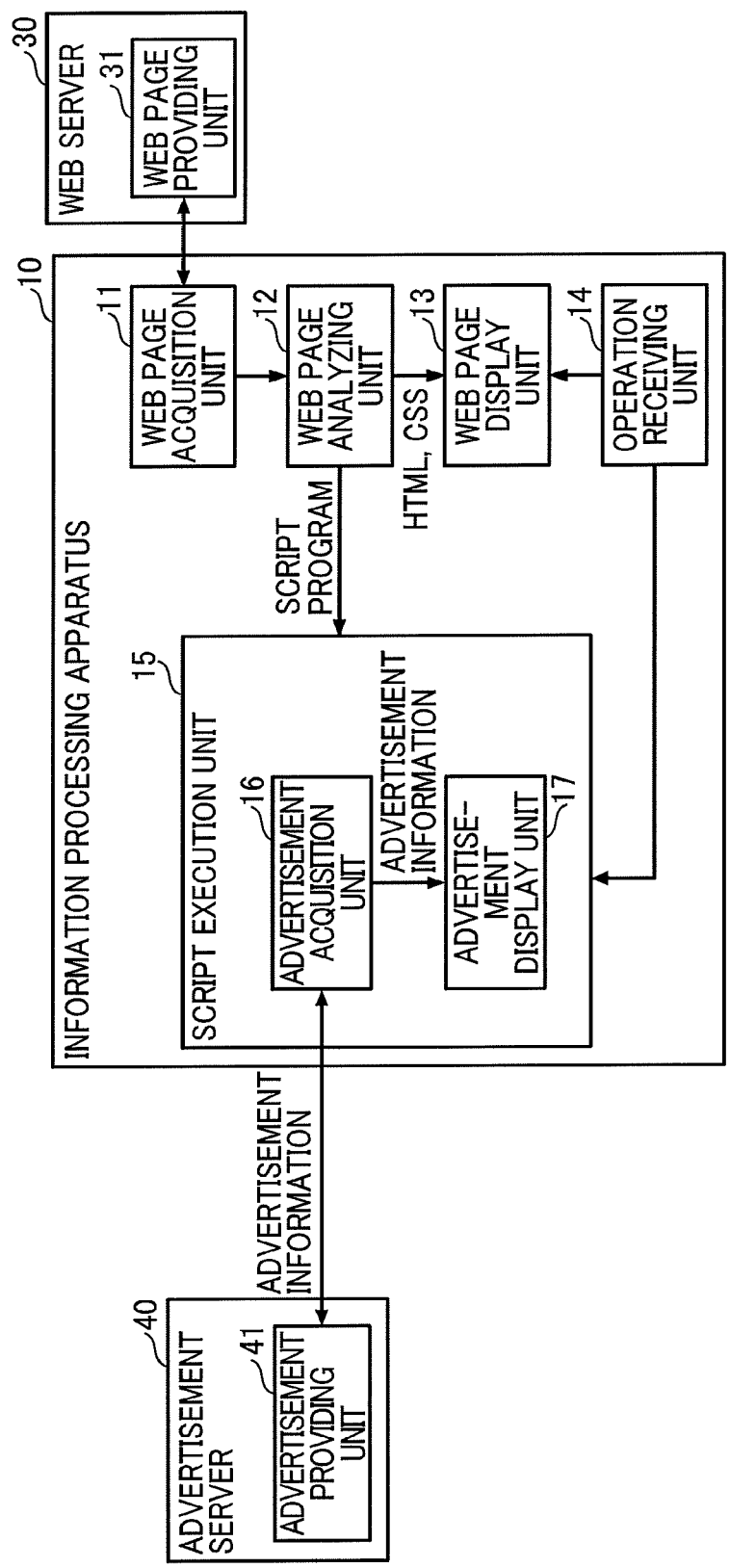
FIG. 5 illustrates an example of a functional block diagram of an information processing apparatus, a Web server, and an advertisement server.

FIG. 5 illustrates an example of a functional block diagram of the information processing apparatus 10, the Web server 30, and the advertisement server 40.

(Information Processing Apparatus)

The information processing apparatus 10 includes, for example, a Web page acquisition unit 11, a Web page analyzing unit 12, a Web page display unit 13, an operation receiving unit 14, and a script execution unit 15. Each of these functions in the information processing apparatus 10 can be implemented when the CPU 201 loads the program 209p on the memory 202 from the HDD 209, and executes the program 209p.

The operation receiving unit 14, which is implemented by instructions of the CPU 201 illustrated in FIG. 4 executing the program 209p, controls the input device 210 and a touch panel. The operation receiving unit 14 receives various types of operation to the information processing apparatus 10. Specifically, the operation receiving unit 14 receives a signal corresponding to an operation to the browser software 301 executed in the information processing apparatus 10. When a Web page includes a program described in a script language (hereinafter, script program), the script program receives an operation instruction (e.g., signal) corresponding to a user operation performed on the Web page. Hereinafter, an operation performed on the information processing apparatus 10, an operation performed on the browser software 301, an operation performed on the Web page are not distinguished, but these operations may be simply referred to as the "user operation on Web page."

The Web page acquisition unit 11, which is implemented by the instructions of the CPU 201 illustrated in FIG. 4 executing the program 209p, controls the network driver 205. When a viewer person performs an operation or when the script program is executed, the Web page acquisition unit 11 communicates with the Web server 30 to acquire a Web page from the Web server 30.

The Web page analyzing unit 12 is implemented by the instructions of the CPU 201 illustrated in FIG. 4 executing the program 209p. The Web page analyzing unit 12 reads HTML included in screen-configuring information, sequentially from the beginning of the HTML, and analyzes structures of text and image data included in the HTML. Further, the Web page analyzing unit 12 detects an association of the text and image data included in the HTML described in CSS, and associates the text and image data included in the HTML with a given style. Further, the Web page analyzing unit 12 detects a script tag from the HTML, and extracts a script program described by a script language. The Web page analyzing unit 12 transmits the HTML and CSS to the Web page display unit 13, and transmits the script program to the script execution unit 15.

The Web page display unit 13 is implemented by the instructions of the CPU 201 illustrated in FIG. 4 executing the program 209p. The Web page display unit 13 displays the Web page on the LCD 206 one by one in the order from the beginning of the HTML each time the Web page analysis has been completed. Further, the Web page display unit 13 updates a display status of the Web page in response to an operation on the Web page.

The script execution unit 15 is implemented by the instructions of the CPU 201 illustrated in FIG. 4 executing the program 209p. The script execution unit 15 executes the script program extracted by the Web page analyzing unit 12. Specific contents of the script program varies depending on the Web page. In the embodiment, an advertisement tag is detected as the script program. The advertisement tag is to be described later with reference to FIG. 6.

The advertisement acquisition unit 16 in the script execution unit 15 acquires advertisement from the advertisement server 40. The advertisement acquisition unit 16 is implemented when the CPU 201 illustrated in FIG. 4 executes the program 209p and the script program. The advertisement acquisition unit 16 accesses the advertisement server 40 by referencing an URL included in the advertisement tag to acquire advertisement information from the advertisement server 40. In the embodiment, the advertisement information includes, for example, a full view spherical image and a display program used for displaying the full view spherical image. The display program is used to change the presentation style of the full view spherical image in response to a direct user operation on the full view spherical image, and to change the presentation style of the full view spherical image in response to a user operation on the Web page where an image such as the full view spherical image is not displayed. The display program is also described in the script language, and executed by the script execution unit 15.

The advertisement display unit 17 in the script execution unit 15 displays the advertisement information acquired from the advertisement server 40. The advertisement display unit 17 is implemented when the CPU 201 illustrated in FIG. 4 executes the program 209p and the display program. The advertisement display unit 17 displays a full view spherical image at a position or location on a Web page corresponding to a position or location where the advertisement tag is described in the HTML. Further, the advertisement display unit 17 changes the presentation style of the full view spherical image in response to a direct user operation on the full view spherical image, and also changes the presentation style of the full view spherical image in response to the user operation on the Web page where the full view spherical image is not displayed.

(Web Server)

The Web server 30 includes, for example, a Web page providing unit 31. The function of the Web server 30 is implemented when the CPU 201 loads the program 209$p$ on the memory 202 from the HDD 209, and executes the program 209$p$.

The Web page providing unit 31 is implemented when the CPU 201 illustrated in FIG. 4 executes the program 209$p$. The Web page providing unit 31 interprets a HTTP request received from the information processing apparatus 10, generates a Web page, and transmits the Web page to the information processing apparatus 10 as a response to the HTTP request. If necessary, the Web page providing unit 31 requests processing to an application server, applies a processing result by the application server to the Web page, and transmits the Web page to the information processing apparatus 10.

(Advertisement Server)

The advertisement server 40 includes, for example, an advertisement providing unit 41. The function of the advertisement server 40 is implemented when the CPU 201 loads the program 209$p$ on the memory 202 from the HDD 209, and executes the program 209$p$.

The advertisement providing unit 41 is implemented when the CPU 201 illustrated in FIG. 4 executes the program 209$p$. The advertisement providing unit 41 interprets a HTTP request received from the information processing apparatus 10, and transmits advertisement information designated or specified by an advertisement tag to the information processing apparatus 10 as a response to the HTTP request.

(Advertisement Tag)

Figures 6, 7:
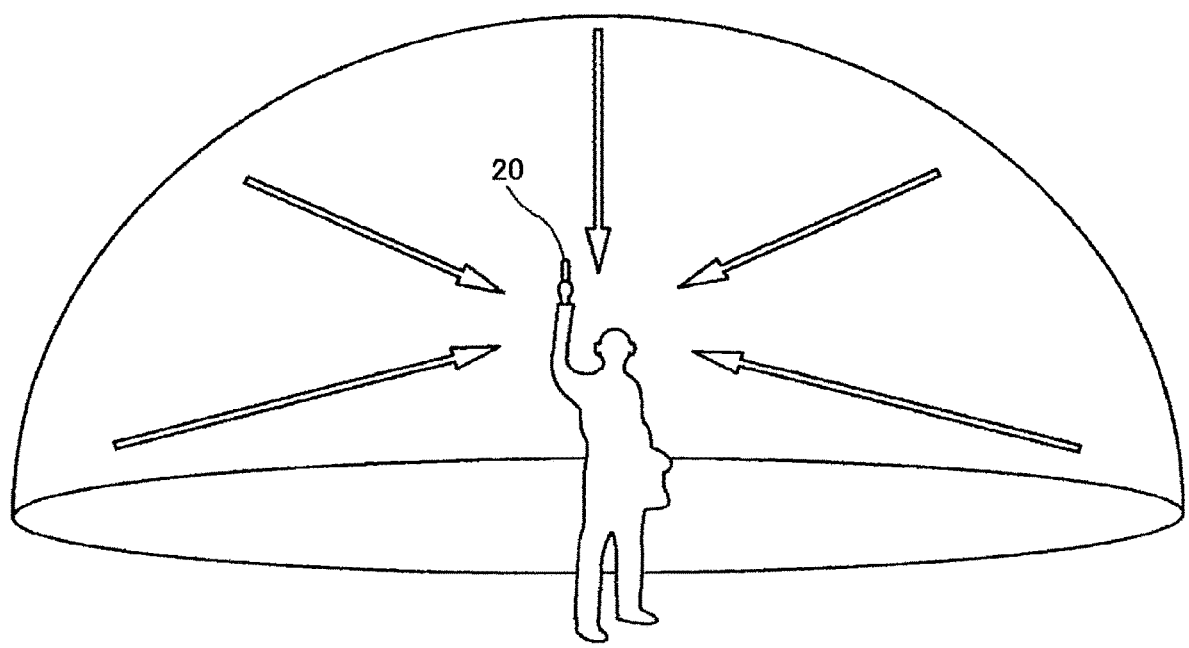
FIG. 6 illustrates an example of a description of an advertisement tag.
FIG. 7 illustrates a scheme of use of a full view spherical camera.

FIG. 6 illustrates an example of a description of an advertisement tag. As described above, the advertisement tag is provided from the advertisement server 40, and set on a Web page by the Web server 30. The advertisement tag is sandwiched by script tags indicating the script language. In an example of FIG. 6, the description of "http . . . adgscriptloaderjs" designates or specifies a program of the advertisement server 40 that provides the advertisement. Further, "id=12345," indicates identification information identifying the advertisement information such as a specific advertisement space. The advertisement server 40 executes "adgscriptloader.js" to read the advertisement information designated by the "id=12345," and transmits the advertisement information to the information processing apparatus 10.

(Full View Spherical Image)

A description is given of a full view spherical image with reference to FIGS. 7 to 10. FIG. 7 illustrates a scheme of use of a full view spherical camera 20. As illustrated in FIG. 7, a user holding the full view spherical camera 20 in his or her hand captures one or more objects around the user by using the full view spherical camera 20. The full view spherical camera 20 is configured by two image capture elements opposed to each other in a casing, and two hemispherical images are obtained by capturing one or more objects around the user by using the two image capture elements.

Figure 8A:
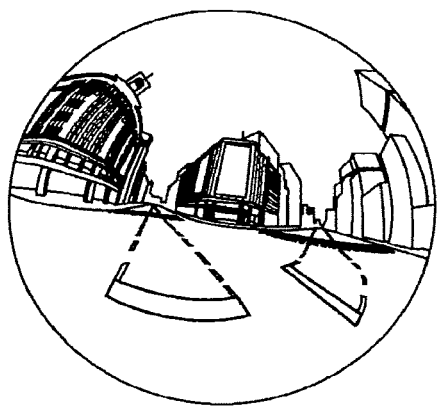
FIGS. 8A, 8B and 8C illustrates a scheme of generating a full view spherical image from hemispherical images captured by a full view spherical camera.
Figure 8B:
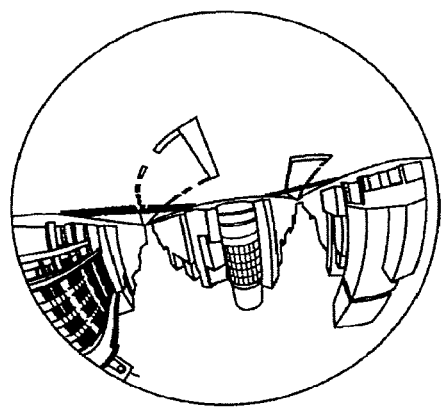
Figure 8C:
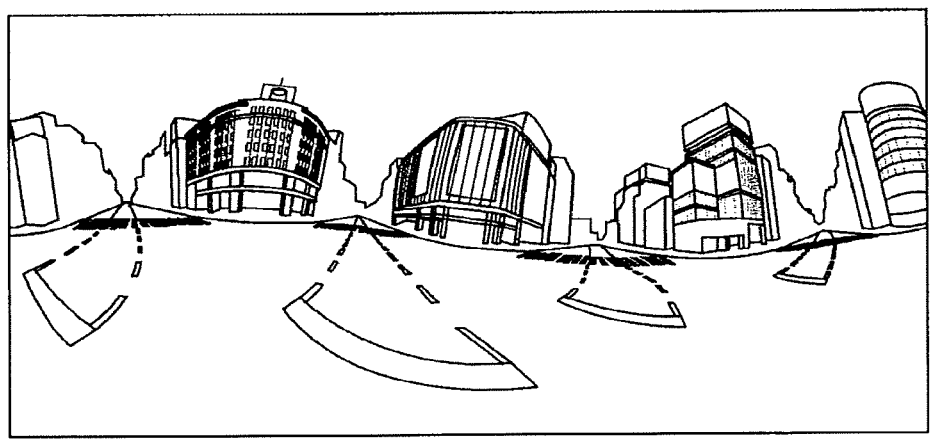
Figure 9A:
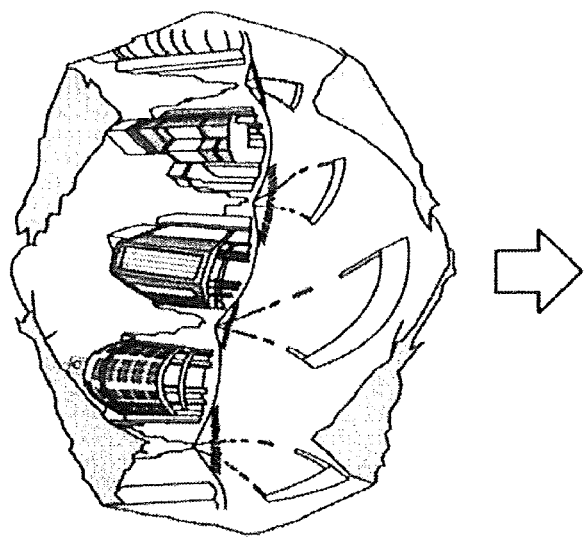
FIGS. 9A and 9B illustrates a scheme of generating a full view spherical image from hemispherical images captured by a full view spherical camera.
Figure 9B:
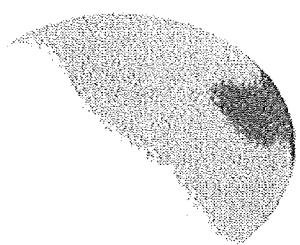
Figure 9B:
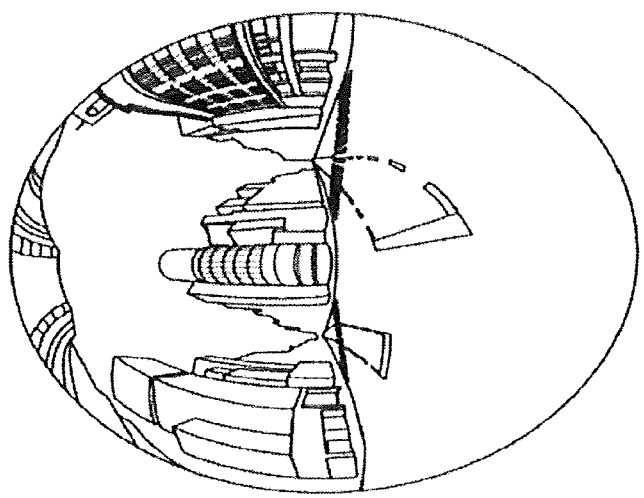

A description is given of a scheme of generating a full view spherical image from images captured by the full view spherical camera 20 with reference to FIGS. 8 and 9. FIG. 8A illustrates one hemispherical image at a front side captured by the full view spherical camera 20, and FIG. 8B illustrates another hemispherical image at a rear side captured by the full view spherical camera 20, and FIG. 8C illustrates an image expressed by using the Mercator method (hereinafter, Mercator image). FIG. 9A illustrates a schematic view that a stereosphere is covered by the Mercator image, and FIG. 9B illustrates an example of a full view spherical image.

As illustrated in FIG. 8A, one image captured by the full view spherical camera 20 becomes the hemispherical image at the front side, which is curved due to the use of one fisheye lens. Further, as illustrated in FIG. 8B, another image captured by the full view spherical camera 20 becomes another hemispherical image at the rear side, which is curved due to the user of another fisheye lens. Then, the hemispherical image at the front side and another hemispherical image at the rear side, which are reversed by 180 degrees from each other, are synthesized by the full view spherical camera 20 to generate the Mercator image as illustrated in FIG. 8C.

Then, when Open Graphics Library for Embedded Systems (OpenGL ES: registered trademark) is applied, the Mercator image is projected on a stereosphere by covering the stereosphere as illustrated in FIG. 9A, and then the full view spherical image is generated as illustrated in FIG. 9B. As indicated in FIG. 9B, the full view spherical image is expressed as a circumferential image that the Mercator image is directed toward the center of the sphere. The OpenGL ES is a graphics library used for visualizing two-dimensional (2D) data and three-dimensional (3D) data. The full view spherical image can be either a still image or a movie.

The full view spherical image is included in the advertisement information distributed from the advertisement server 40. Since an image projected on a surface of the stereosphere by covering the stereosphere becomes the full view spherical image such as a curved image, when a viewer person sees the full view spherical image, the viewer person may feel a sense of incongruity. Therefore, the information processing apparatus 10 displays the target region T, which is a part of the full view spherical image, as a planar image reducing curvature so as not to give the sense of incongruity to the viewer person. The target region T is defined by coordinates (X, Y, Z) in a virtual three dimensional space. Since the LCD 206 is a two dimensional plane, the information processing apparatus 10 cannot display the target region T as it is on the LCD 206. Therefore, the information processing apparatus 10 obtains the region image 302 by performing a perspective projection transformation projecting a three dimensional object on the two dimensional plane using the 3D computer graphics technique. With this configuration, the target region T in the full view spherical image illustrated in FIG. 1 can be displayed on the LCD 206 as the region image 302.

Figure 10:
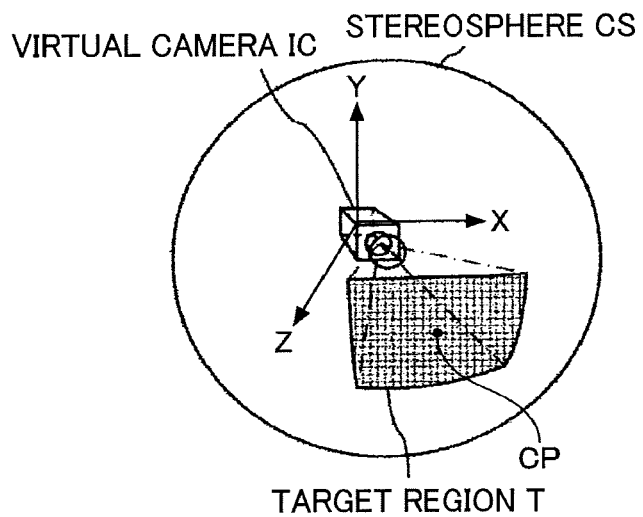
FIG. 10 illustrates an example of a gaze direction of a viewer person.

FIG. 10 illustrates an example of a gaze direction of a viewer person. Since a full view spherical image has three dimensional coordinates, a gaze direction can be identified by information specifying coordinates on a stereosphere such as coordinates and latitude/longitude in the three dimensional space. In the embodiment, the center "cp" of the target region T is set as the gaze direction.

The gaze direction can be changed by a viewer person by using the operable unit. When it is assumed that the virtual camera IC is not moved in a parallel direction, the virtual camera IC can rotate as a rigid body about three axes such as roll (rotation about the Z-axis), yaw (rotation about the Y axis), and pitch (rotation about the X axis). When any one of the three rotations occurs, the gaze direction changes. For example, when the viewer person rotates the full view spherical image along the horizontal direction, the yaw angle changes. When the viewer person rotates the full view spherical image along the vertical direction, the pitch angle changes. When the viewer person rotates the full view spherical image about the center of the LCD 206, the roll angle changes. In the embodiment, a user operation performed by the viewer person on the Web page causes or triggers the change in the gaze direction (e.g., roll angle, yaw angle, pitch angle). It is assumed that the display program includes the description how the gaze direction is changed depending on the user operation on the Web page.

(Operation of Displaying Advertisement)

Figure 11:
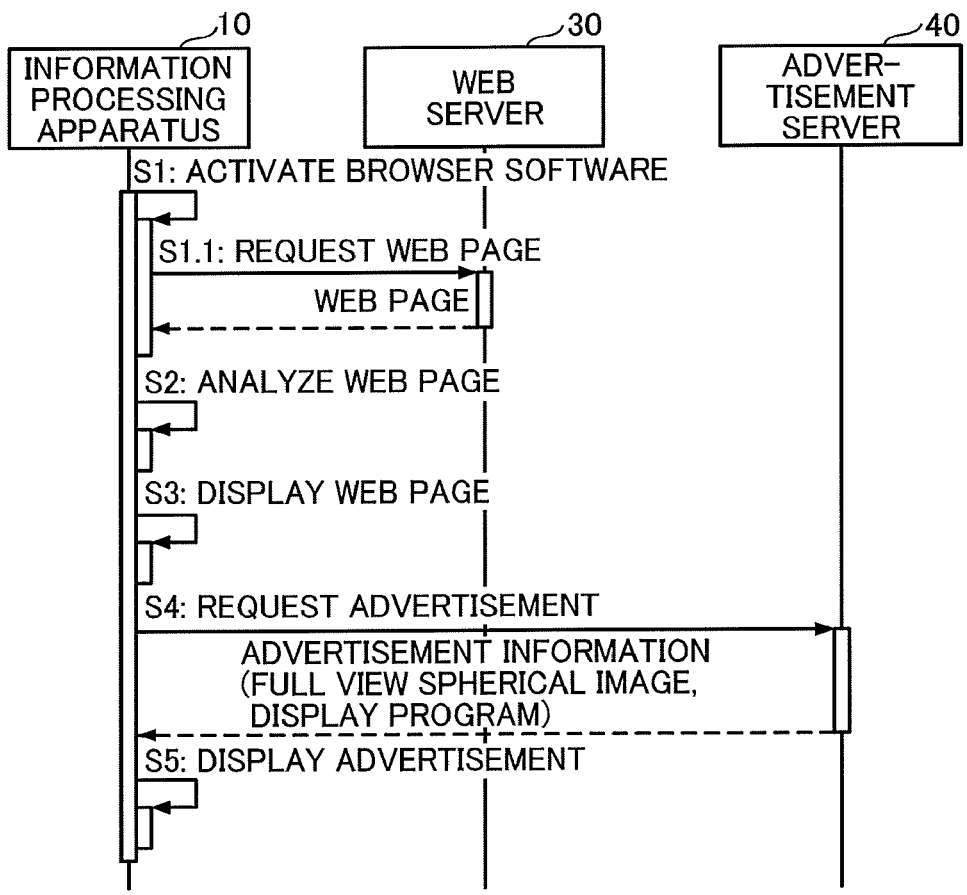
FIG. 11 illustrates an example of a sequence diagram of displaying an advertisement included in a Web page by using an information processing apparatus.

FIG. 11 illustrates an example of a sequence diagram of displaying an advertisement on a Web page by using the information processing apparatus 10.

S1: A viewer person performs an activation operation of the browser software 301 used for browsing a Web page. The information processing apparatus 10 activates the browser software 301 in response to the activation operation requested by the viewer person.

S1.1: Since a home page is set for the browser software 301, when the browser software 301 is activated, the Web page acquisition unit 11 acquires a Web page (i.e., homepage) automatically. It is assumed that the acquired Web page includes an advertisement, and the viewer person can designate any Web page set with the advertisement.

S2: The web page analyzing unit 12 analyzes the acquired Web page. As described above, the web page analyzing unit 12 extracts the HTML, CSS, and script program.

S3: The Web page display unit 13 displays the Web page on the LCD 206 based on the HTML and CSS. When the Web page includes many resources (e.g., images), the Web page display unit 13 receives the resources sequentially, in which the Web page display unit 13 arranges the resources based on the received order.

S4: The advertisement acquisition unit 16 requests advertisement information to the advertisement server 40 based on a script program of an advertisement tag. With this configuration, the advertisement acquisition unit 16 acquires the advertisement information (e.g., full view spherical image, display program).

S5: The advertisement display unit 17 displays the full view spherical image acquired by the advertisement acquisition unit 16 at a position or location on the Web page corresponding to a position or location where the advertisement tag is described in the HTML. That is, the advertisement display unit 17 displays the full view spherical image in the advertisement space. With this processing, the full view spherical image used as the advertisement is displayed on the Web page. Further, an initial gaze direction of the full view spherical image can be set in advance.

(Reflection of Operation to Displayed Advertisement)

Figure 12:
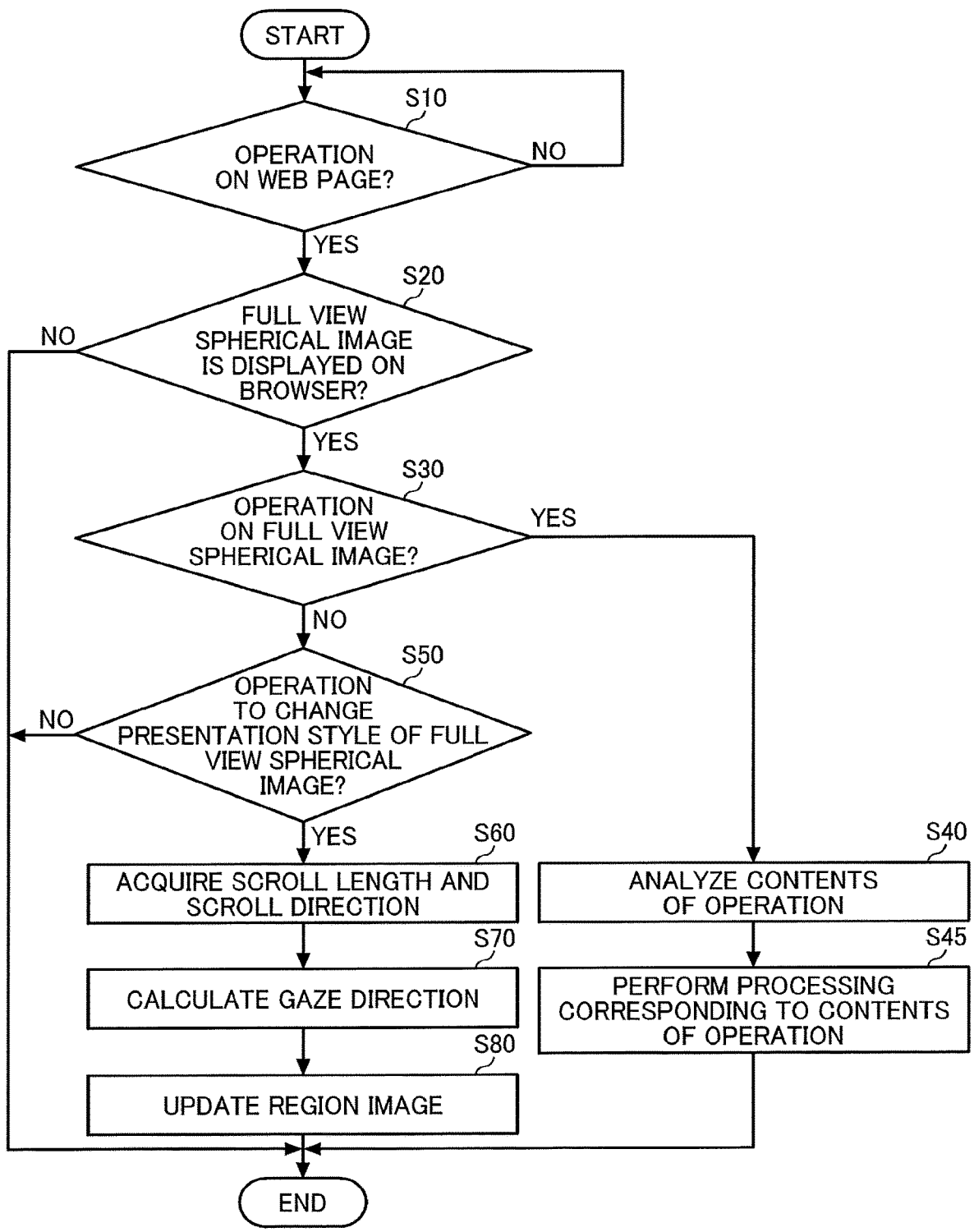
FIG. 12 is an example of a flowchart illustrating the step of reflecting a user operation performed on a Web page to a full view spherical image by an information processing apparatus.

FIG. 12 is an example of a flowchart illustrating the steps of reflecting a user operation performed on a Web page to a full view spherical image by the information processing apparatus 10. The sequence of FIG. 12 starts when a Web page is displayed on a display by the information processing apparatus 10, and is executed repeatedly.

At first, the operation receiving unit 14 determines whether a user operation is performed on the Web page (S10). The user operation on the Web page includes various operations. For example, the user operation on the Web page includes a scroll operation, a clicking operation, a double clicking operation, a dragging operation, a character input operation, but not limited to thereto. Further, the user operation on the touch panel includes, for example, a slide operation, a tapping operation, a long press operation, a three dimensional (3D) display operation, a pinching-in operation, a pinching-out operation, or the like. The operation receiving unit 14 repeats S10 until the user operation is detected.

When the determination at step S10 is "YES," the advertisement display unit 17 determines whether a full view spherical image is displayed on a display area of the browser software 301 (S20). In some cases, a size of the Web page may be greater than the display area of the browser software 301. In such case, the advertisement display unit 17 determines whether the browser software 301 currently displays the advertisement space on the display area of the browser software 301.

When the full view spherical image is not displayed on the display area of the browser software 301, the viewer person is not able to operate on the full view spherical image, and further even if the scroll operation performed on the Web page is caused to change the presentation style of the full view spherical image when the full view spherical image is not displayed on the display area of the browser software 301, the viewer person does not see the full view spherical image. Therefore, when the full view spherical image is not displayed on the display area of the browser software 301, the gaze direction is not required to be calculated, in which processing load of the information processing apparatus 10 can be reduced. However, even if the full view spherical image is not displayed on the display area of the browser software 301, the change in the gaze direction of the full view spherical image can be performed without causing problems.

When the determination at step S20 is "NO," the sequence of FIG. 12 ends. The processing of determination is to be described with reference to FIG. 13.

When the determination at step S20 is "YES," the advertisement display unit 17 determines whether the user operation is performed on the full view spherical image (S30). The advertisement display unit 17 determines whether the user operation is performed on the full view spherical image or not by determining whether coordinates of the full view spherical image and the coordinates of the position receiving the user instruction, such as the cursor 9, overlap with each other at least partly. Since the advertisement display unit 17 acquires the coordinates of the cursor 9 on the LCD 206 from the operation receiving unit 14, and the coordinates of the advertisement space displaying the full view spherical image are known, the advertisement display unit 17 can determine whether the coordinates of the cursor 9 overlaps with the full view spherical image. The processing of determination is to be described with reference to FIG. 13.

When the determination at step S30 is "YES," the sequence proceeds to step S40. At step S40, the advertisement display unit 17 analyzes the contents of the user operation (S40). The contents of the user operation are described, for example, at step S10. The valid user operation on the full view spherical image is set in advance. Examples of the contents of the user operation are described as below.

A) Scroll to upward: Enlarge full view spherical image in size

B) Scroll to downward: Reduce full view spherical image in size

C) Click: Transmit HTTP request to linked URL

In this configuration, the display program has a description that the enlargement or reduction is performed in response to a detection of the scroll operation on the full view spherical image. Further, the display program has a description that HTTP request is transmitted to the described URL in response to a detection of the clicking operation on the full view spherical image.

The advertisement display unit 17 performs processing corresponding to the contents of the user operation (S45), and then the sequence of FIG. 12 ends. When the same Web page is displayed subsequently, the processing from step S10 is repeated.

When the determination at step S30 is "NO," the advertisement display unit 17 determines whether the presentation style of the full view spherical image is to be changed (S50). When a pre-set user operation is detected on the Web page, the advertisement display unit 17 changes the presentation style of the full view spherical image even when coordinates of the operable unit and the full view spherical image do not overlap with each other. In other words, the user operation on the Web page is reflected to the presentation style of the full view spherical image. The pre-set user operation at step S50 can be any operation, in which one or more user operations that the viewer person uses frequently can be used effectively for guiding the gaze direction of the viewer person. If a given user operation is frequently used by the viewer person, the given user operation can be reflected to the full view spherical image frequently, and the probability that the viewer person recognizes the full view spherical image becomes higher. In a case of FIG. 12, it is assumed that the scroll operation performed on the Web page is reflected to the presentation style of the full view spherical image as the user operation.

When the scroll operation is detected (S50: YES), the advertisement display unit 17 acquires a scroll length and a scroll direction from the operation receiving unit 14 (S60). Since the viewer person operates on the Web page, the Web page display unit 13 scrolls the Web page based on the scroll operation, which means that the Web page display unit 13 updates a display status of the screen, in which one or more signals corresponding to the scroll operation is input to the information processing apparatus 10. In this disclosure, the display status of the screen means contents displayed in the screen. For example, as illustrated in FIGS. 2A and 2B, when the viewer person scrolls down the Web page of FIG. 2A, the region image 302 moves upward as illustrated in FIG. 2B, in which the contents displayed in the screen in FIG. 2A is changed or updated to the contents displayed in the screen in FIG. 2B.

Then, the advertisement display unit 17 calculates the gaze direction based on the scroll length and the scroll direction (S70).

Since the gaze direction is changed, the advertisement display unit 17 generates the region image 302 by performing the perspective projection transformation to the target region T including the center "cp" as a new gaze direction (S80). That is, the advertisement display unit 17 displays a part of the full view spherical image, which has not been displayed before the scroll operation is performed, on the Web page.

As above described, when the Web page is scrolled, the gaze direction of the full view spherical image is changed. That is, the scroll operation causes the change in the presentation style of the full view spherical image not intended by the viewer person. Since the presentation style of the full view spherical image is changed, the probability that the viewer person recognizes the full view spherical image becomes higher. In this configuration, since the full view spherical image can be displayed while changing the gaze direction, the viewer person can easily recognize that the image that he or she is seeing on the screen is the full view spherical image that can change the presentation style.

Further, in the embodiment, the scroll operation directly performed on the full view spherical image causes enlargement and reduction of the full view spherical image while the scroll operation performed on the Web page causes the rotation of the full view spherical image. In other words, when the user operation is directly performed on the full view spherical image, the presentation style of the full view spherical image is changed by applying one mode (first mode) while when the user operation is not performed on the full view spherical image but the user operation is performed on a portion of the Web page, the presentation style of the full view spherical image is changed by applying another mode (second mode), in which the presentation style of the full view spherical image can be changed using the different modes depending on a position on the screen where the user operation is performed. With this configuration, the gaze direction of the viewer person can be easily guided to the full view spherical image.

(Determination Whether Coordinates of Operable Unit Overlaps with Full View Spherical Image)

Figure 13:
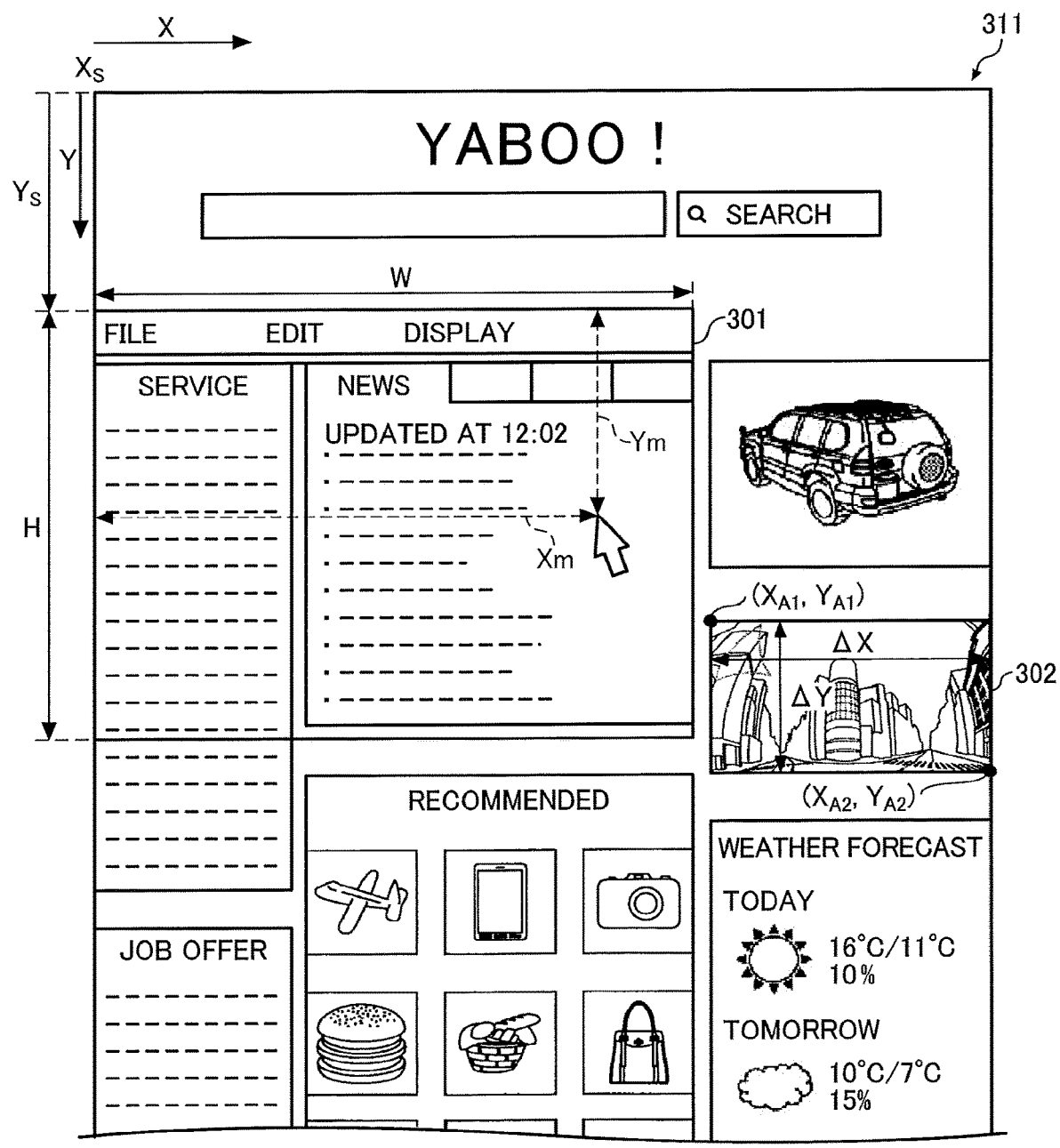
FIG. 13 illustrates an example of a Web page including a full view spherical image at a position, and coordinates of an operable unit.

FIG. 13 illustrates an example of a Web page including a full view spherical image at one position, and coordinates of the operable unit. FIG. 13 illustrates an example of a Web page 311 displayed on the display such as the LCD 206 by using the browser software 301. In an example case of FIG. 13, since a size of a window of the browser software 301 is smaller than a size of the Web page 311, the browser software 301 displays a part of the Web page 311. Hereinafter, for the simplicity of description, it is assumed that the size of the window of the browser software 301 matches a size of the LCD 206, in which the window of the browser software 301 is displayed as a full screen on the LCD 206.

The browser software 301 constantly detects the scroll length of the Web page 311. The advertisement display unit 17 acquires a current scroll length Xs and a current scroll length Ys from the browser software 301. The scroll length Xs indicates the scroll length in the lateral direction, and the scroll length Ys indicates the scroll length in the longitudinal direction. The scroll length can be expressed as a distance between the upper left corner of the Web page 311 and the upper left corner of the browser software 301 (e.g., distance is expressed by the number of pixels). In an example case of FIG. 13, the scroll length Xs is zero (0).

Further, the size of the window of the browser software 301 can be defined by a width W and a height H, and a position of the full view spherical image on the Web page 311 defined by the coordinates of $(X_{A1}, Y_{A1})$ and $(X_{A2}, Y_{A2})$, corresponds to the advertisement space. In this configuration, it is assumed that the size of the window of the browser software 301 and the position of the full view spherical image on the Web page 311 are known.

Therefore, the browser software 301 can display at least a part of the full view spherical image when any one of the following conditions (i) to (iv) is satisfied.

(i) $Xs \leq X_{A1} \leq Xs+W$ and $Ys \leq Y_{A1} \leq Ys+H$
(ii) $Xs \leq X_{A2} \leq Xs+W$ and $Ys \leq Y_{A2} \leq Ys+H$
(iii) $Xs \leq X_{A1}+\Delta X \leq Xs+W$ and $Ys \leq Y_{A1} \leq Ys+H$
(iv) $Xs \leq X_{A1} \leq Xs+W$ and $Ys \leq Y_{A1}+\Delta Y \leq Ys+H$ Hereinafter, a description is given of a process of determining whether coordinates of the operable unit such as the cursor 9 overlaps with a full view spherical image. The coordinates Xm and Ym of the operable unit on the LCD 206 are being detected constantly by the operating system (OS) of the information processing apparatus 10. Therefore, the coordinates X and Y of the operable unit on the Web page can be expressed as below.

$$X=Xs+Xm$$

$$Y=Ys+Ym$$

Therefore, when a condition of "$X_{A1} \leq X \leq X \leq X_{A2}$" and "$Y_{A1} \leq Y \leq Y_{A2}$" is satisfied, the advertisement display unit 17 determines that the operable unit overlaps with the full view spherical image.

(Scroll and Gaze Direction)

A Web page is often scrolled in the vertical direction, but a scroll operation on the Web page along the horizontal direction can be also reflected on the presentation style of the full view spherical image. The rotational direction of the full view spherical image can be about any one of the Y axis (horizontal direction), the X axis (vertical direction), and the Z-axis (rotation about the center of the LCD 206). However, since the viewer person may observe a plurality of portions on the screen along the horizontal direction, if the full view spherical image rotates along the horizontal direction alone when the viewer person is to browse the full view spherical image, the subsequent operation can be performed easily. Therefore, in the embodiment, when the Web page is scrolled in the vertical direction or the horizontal direction, it is assumed that the advertisement display unit 17 rotates the full view spherical image about the Y axis.

Figure 14A:
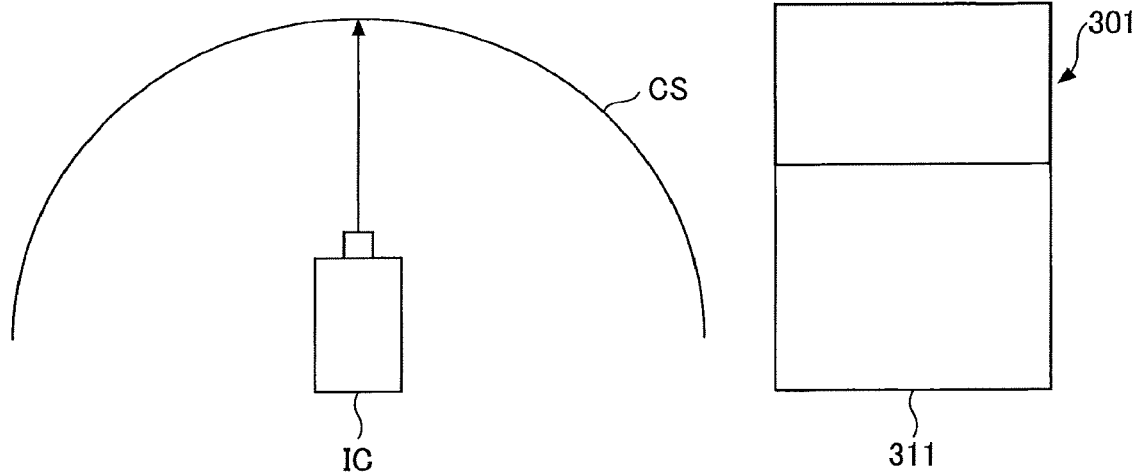
FIGS. 14A and 14B illustrate an example of a relationship of a scroll length in a Web page and a gaze direction.
Figure 14B:
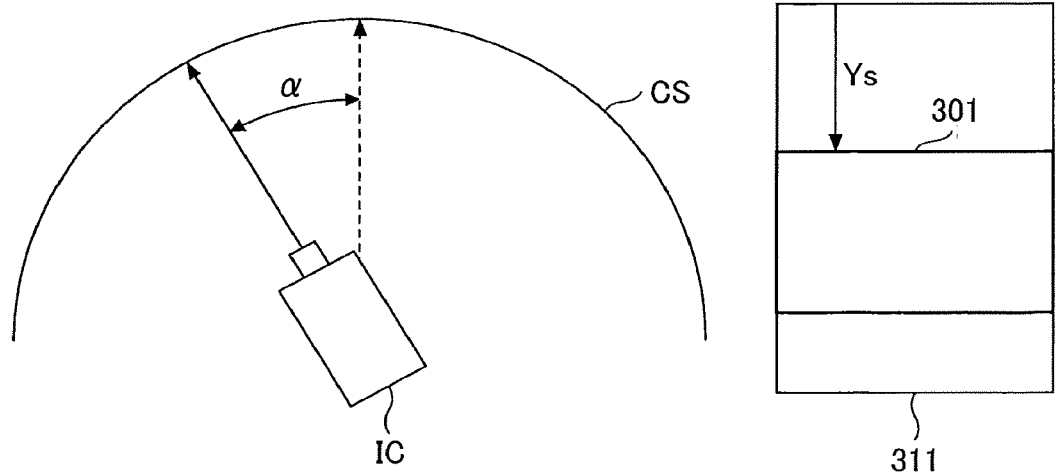

FIGS. 14A and 14B (FIG. 14) illustrate an example of a relationship of a scroll length on a Web page and a gaze direction. FIG. 14A illustrates one gaze direction and one scroll length on the Web page in an initial state, and FIG. 14B illustrates another gaze direction and another scroll length on the Web page after changing the gaze direction. In this example case of FIG. 14, the scroll length of the Web page at the initial state is zero, and then the viewer person scrolls the Web page downward with the scroll length Ys. Then, the gaze direction of is rotated to the left along the horizontal direction. The advertisement display unit 17 calculates a change amount "α" of the gaze direction using the following formula (1).

$$\alpha = k1 \times Ys \quad (1)$$

In this formula (1), "k1" is a conversion coefficient for converting the scroll length Ys to the change amount "α" of the gaze direction. As indicated in the formula (1), the greater the "k1," the greater the change amount "α" of the gaze direction. Further, if the viewer person scrolls the Web page with a faster speed, the gaze direction changes with a faster speed.

Further, the scroll speed on the Web page can be reflected to the change amount "α" of the gaze direction. The advertisement display unit 17 calculates the scroll speed Vs by calculating the scroll length Ys per unit time. Then, the advertisement display unit 17 calculates the change amount "α" in the gaze direction using the following formula (2).

$$\alpha = k2 \times Vs \quad (2)$$

As indicated in the formula (2) used for calculating the change amount "α" in the gaze direction, when the viewer person scrolls the Web page with a faster speed, the full view spherical image also rotates with a faster speed, with which the viewer person can easily recognize that the image displayed on the Web page is the full view spherical image.

Further, when the viewer person scrolls the Web page upward (i.e., the scroll length Ys becomes a negative value), the change amount "α" in the gaze direction becomes a negative value, and thereby the gaze direction rotates to the right direction along the horizontal direction.

Further, when the scroll direction of the Web page is one direction, the advertisement display unit 17 can shift the gaze direction between the left and right along the horizontal direction. In this configuration, the advertisement display unit 17 calculates the change amount "α" in the gaze direction by substituting the scroll length of the Web page into a function such as a sine function that changes periodically. When the function such as a sine function is used, the change amount "α" in the gaze direction changes periodically within a given range between a positive value and a negative value, in which the gaze direction can be shifted from the right to the left, and from the left to the right. In this configuration, the viewer person see that the image is vibrating, with which the viewer person can easily recognize the image displayed on the Web page is the full view spherical image.

(Reflection of Other Operations on Web Page to Presentation Style of Full View Spherical Image)

As described above, the user operation reflected to the presentation style of the full view spherical image is not limited to the scroll operation. Hereinafter, a description is given of examples of the user operation other than the scroll operation that can be reflected to the presentation style of the full view spherical image.

Figure 15A:
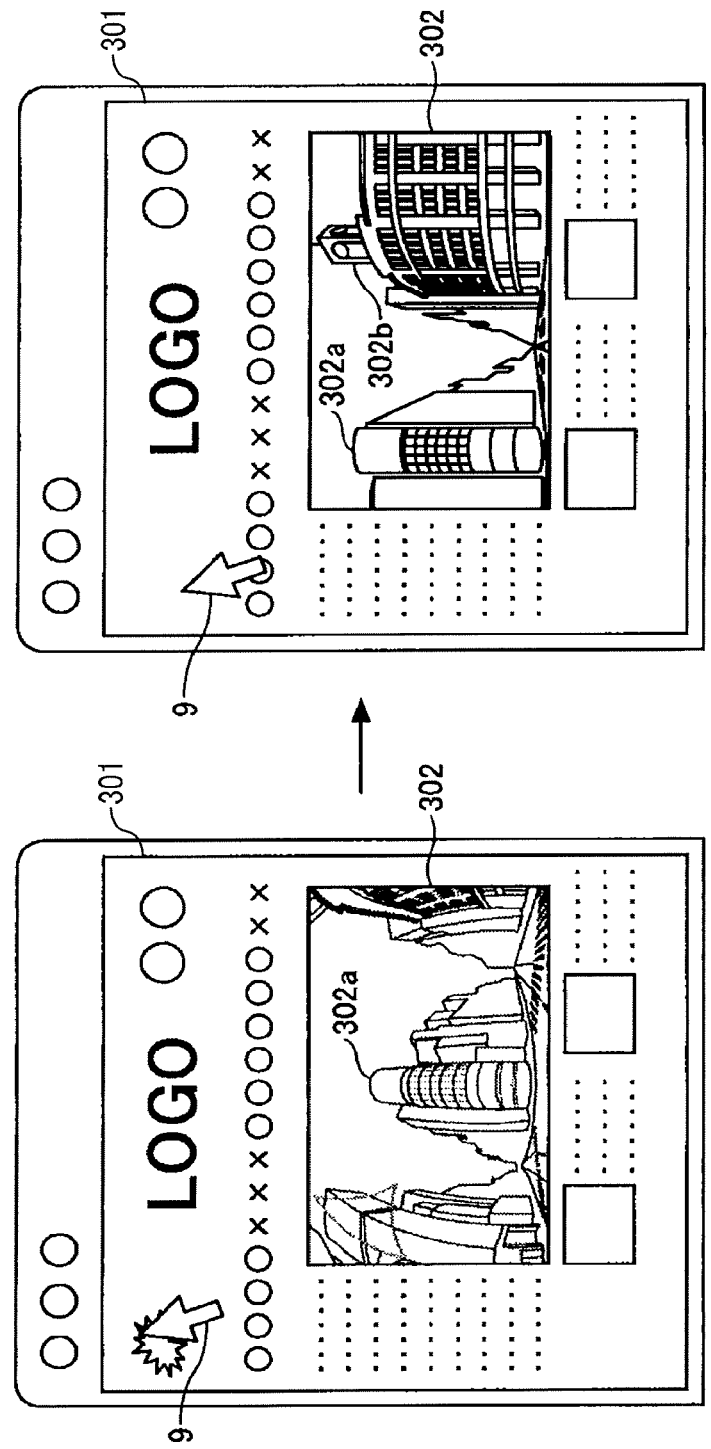
FIG. 15A illustrates an example of a full view spherical image when a presentation style of a full view spherical image is changed by a clicking operation on a Web page.

FIG. 15A illustrates an example of a full view spherical image when a presentation style of the full view spherical image is changed by a clicking operation on a Web page. In an example case of FIG. 15A, the Web page is not scrolled. When the clicking operation on the Web page is detected, the advertisement display unit 17 rotates the full view spherical image to the left along the horizontal direction. The amount of change in the gaze direction for one clicking operation is set in advance. Further, the full view spherical image can be rotated to the right, or the rotation direction can be reversed between the right and the left for each other click.

The advertisement display unit 17 can also change the presentation style of the full view spherical image when a double clicking operation is performed. The amount of change in the gaze direction for the double clicking operation can be set greater than the amount of change in the gaze direction of the one clicking operation. Further, in a case of the double clicking operation, the advertisement display unit 17 can change the gaze direction in two stages, in which the viewer person sees that the presentation style of the full view spherical image changes for two times, with which the viewer person can easily recognize the image is the full view spherical image.

FIG. 15B illustrates an example of a full view spherical image when a presentation style of the full view spherical image is changed by a dragging operation on a Web page. In an example case of FIG. 15B, the operable unit such as the cursor 9 is being dragged on characters. The dragging operation is used, for example, for selecting text, and moving an object. When the dragging operation on the Web page is detected, the advertisement display unit 17 rotates the full view spherical image along the horizontal direction. The amount of dragging and the amount of change in the gaze direction are set in advance. The rotation direction can be set based on the direction of the dragging operation.

FIG. 15C illustrates an example of a full view spherical image when a presentation style of the full view spherical image is changed by inputting characters to a Web page. In an example case of FIG. 15C, a character input column 321 is selected, and a viewer person inputs characters in the character input column 321. When the inputting of characters in the character input column 321 on the Web page is detected, the advertisement display unit 17 rotates the full view spherical image along the horizontal direction. The amount of change in the gaze direction per one input of character is set in advance. The amount of change in the gaze direction and the rotating direction can be changed depending on types of character. Since the full view spherical image rotates each time a character is input, the viewer person can easily recognize that the image is the full view spherical image.

FIG. 15 describes example cases using the mouse cursor as the operable unit, but not limited thereto. For example, a finger can be used as the operable unit to perform a finger operation on a touch panel, in which the finger operation causes a change in the presentation style of the full view spherical image. For example, the advertisement display unit 17 can process a tapping operation performed on the touch panel by the finger similar to the clicking operation by the mouse cursor. Further, the advertisement display unit 17 can process the dragging operation performed on the touch panel by the finger similar to the dragging operation by the mouse cursor. Further, the advertisement display unit 17 can process a sliding operation performed on the touch panel by the finger similar to the scroll operation by the mouse cursor. Further, when a pinching-out operation or a pinching-in operation is performed on the touch panel by the finger, the advertisement display unit 17 can change the presentation style of the full view spherical image. Further, when a long press operation or a three dimensional (3D) display operation is performed on the touch panel by the finger, the advertisement display unit 17 can change the presentation style of the full view spherical image.

Further, any types of the user operation on the Web page can be caused to change the presentation style of the full view spherical image when any types of the operable unit are used.

(Presentation Style of Full View Spherical Image)

In any one of the above-described examples such as examples described in FIG. 15, the user operation such as the scroll operation performed on a portion of the Web page changes the gaze direction of the full view spherical image (e.g., rotation of the full view spherical image), but the user operation performed on the portion of the Web page can cause to change the presentation style of the full view spherical image in various other ways. For example, a given change in the presentation style of the full view spherical image, which is caused by one user operation directly performed on the full view spherical image, can be caused by the one user operation performed on the portion of the Web page. For example, when the scroll operation is performed on the portion of the Web page corresponding to the second region, the advertisement display unit 17 can be configured to enlarge or reduce a size of the full view spherical image (that is, a size of the target region) without changing the gaze direction.

Figure 16A:
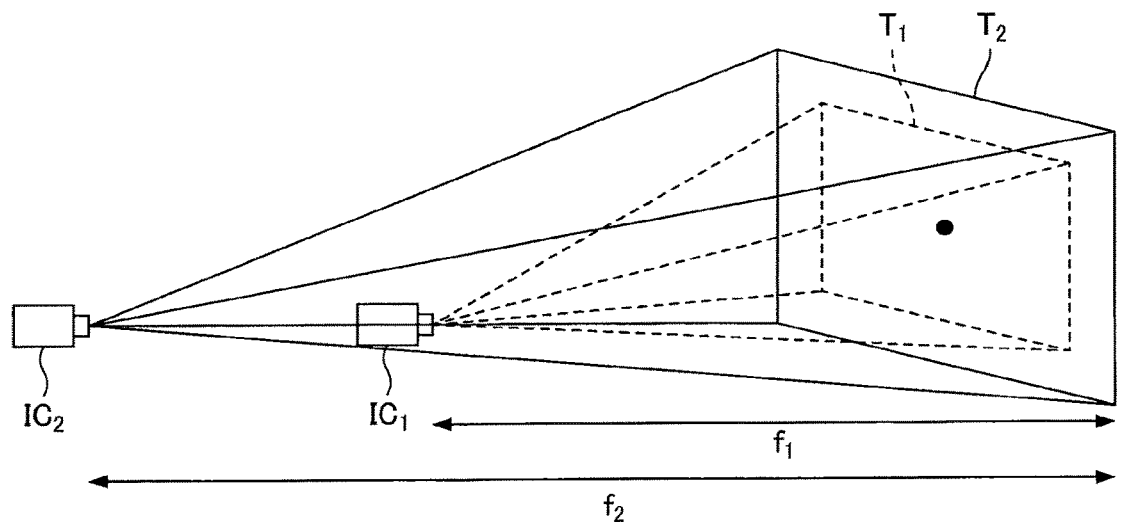
FIG. 16A illustrates a scheme of enlargement and reduction of a full view spherical image.

FIG. 16A illustrates a scheme of enlargement and reduction of a full view spherical image. The enlargement corresponds to a case of reducing the distance between the virtual camera IC and the full view spherical image, and the reduction corresponds to a case of increasing the distance between the virtual camera IC and the full view spherical image. In FIG. 16A, since the distance f1 is shorter than the distance f2 (f1<f2), when the distance changes from the distance f1 to the distance f2, the full view spherical image is displayed with a reduced size, and when the distance changes from the distance f2 to the distance f1, the full view spherical image is displayed with an enlarged size. Further, instead of changing the distance as illustrated in FIG. 16A, the full view spherical image can be reduced by setting a greater angle of view, and the full view spherical image can be enlarged by setting a smaller angle of view.

When the advertisement display unit 17 enlarges or reduces the full view spherical image such as when the advertisement display unit 17 changes the distance between the virtual camera IC and the full view spherical image in response to the scroll length, the size of the target region T also changes, and then the advertisement display unit 17 performs the perspective projection conversion to the target region T.

Figure 16B:
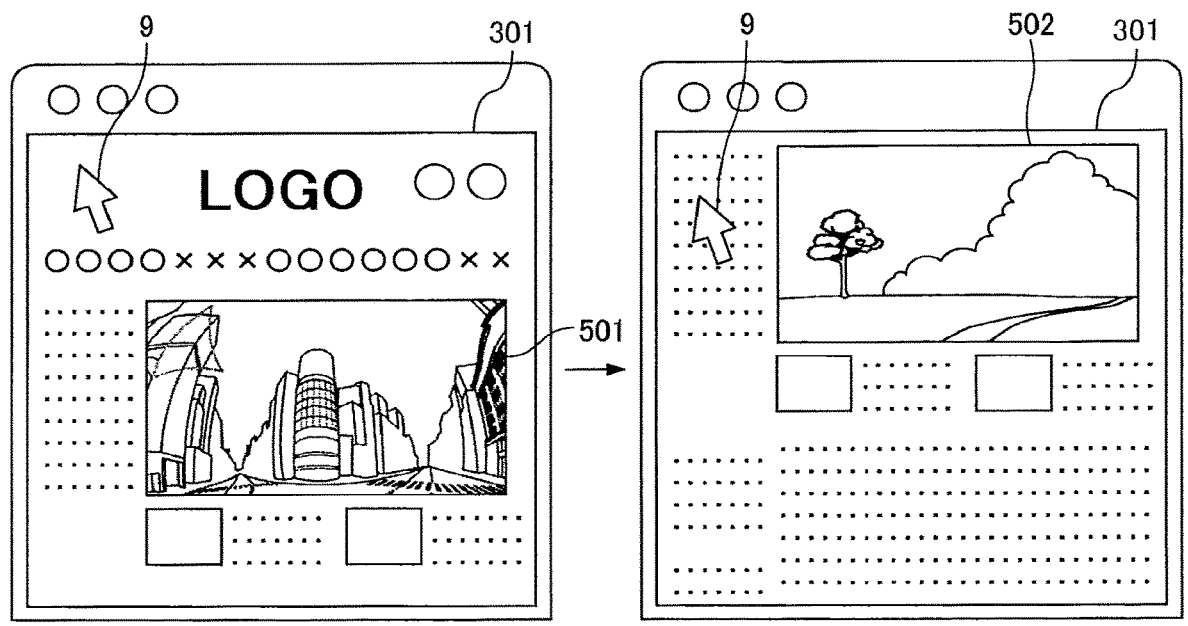
FIG. 16B illustrates an example of a scheme of switching full view spherical images.

Further, as illustrated in FIG. 16B, the advertisement display unit 17 can switch one full view spherical image to another full view spherical image when a Web page is scrolled. FIG. 16B illustrates an example of a scheme of switching one full view spherical image to another full view spherical image. As illustrated in the left side and the right side in FIG. 16B, when the Web page is scrolled, the one full view spherical image is switched to another full view spherical image. As illustrated in FIG. 16B, the one full view spherical image of the left side of FIG. 16B is an image of a town with tall buildings, and another full view spherical image of the right side of FIG. 16B is an image of a scenery of a suburban area.

When the scroll operation performed on the Web page is detected, the advertisement display unit 17 displays at least two or more of the full view spherical images in the advertisement space by switching the two or more of the full view spherical images. For example, the advertisement display unit 17 switches the full view spherical images when the scroll length becomes a given length. It is preferable that the full view spherical image is rotated until the scroll length becomes the given length (e.g., one rotation for the given length of the scroll length). In this configuration, when the rotation of one full spherical image is completed, the one full view spherical image can be switched to another full view spherical image. The gaze direction of another full view spherical image switched from the one full spherical image can be set with the initial state. Since color tone or the like changes greatly when the full view spherical images are switched, the viewer person can easily recognize that the image is the full view spherical image.

Figure 17:
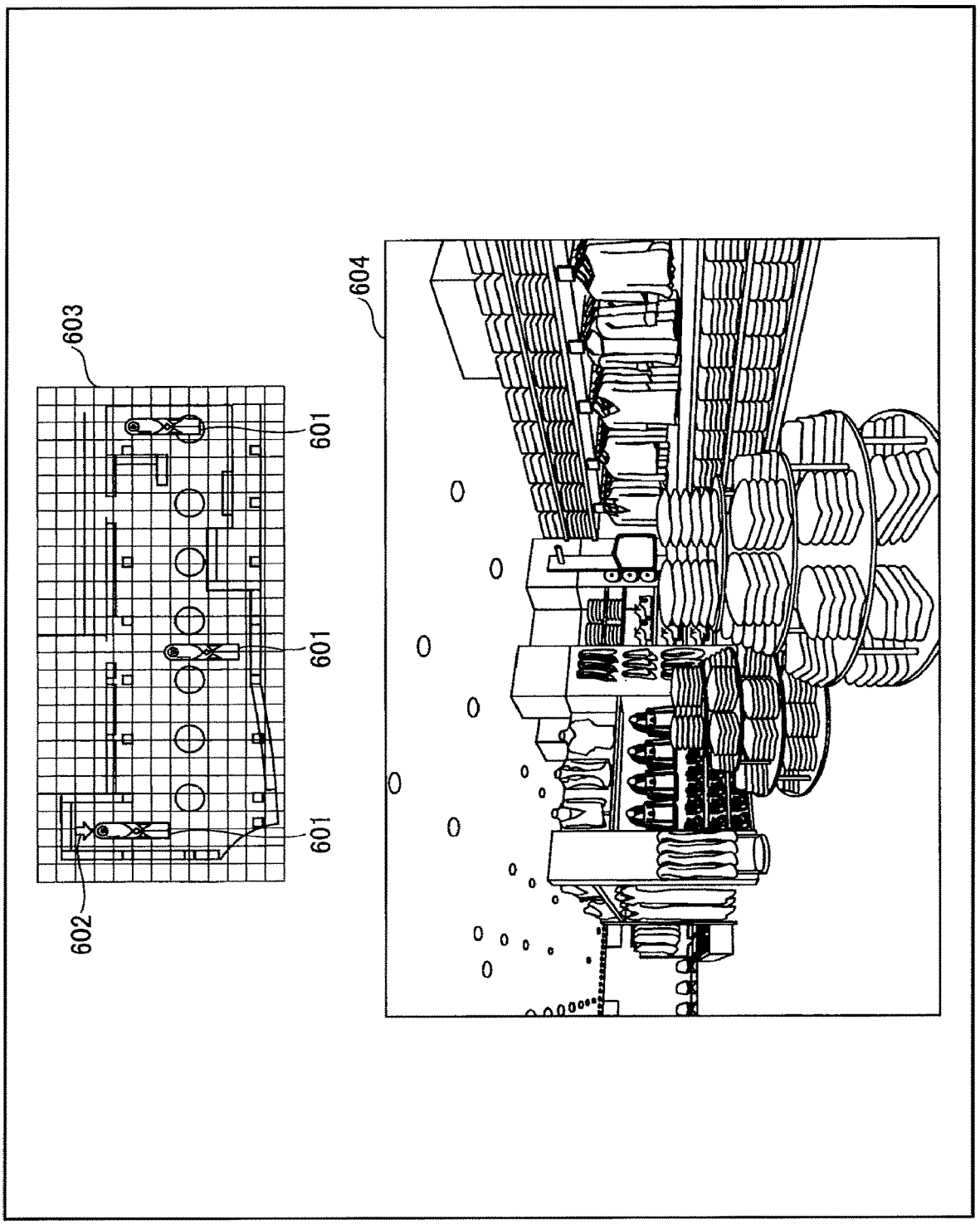
FIG. 17 illustrates an example of switching of a plurality of full view spherical images captured at different locations.

The above described switching of the full view spherical images is effective when a plurality of the full view spherical images are generated at different image capture positions or locations. FIG. 17 illustrates an example of switching of a plurality of full view spherical images captured at different locations. For example, a layout map 603 is displayed on a Web page as illustrated in FIG. 17. When a viewer person selects an icon 601 indicating the full view spherical camera 20 set at a location where the viewer person wants to browse image data, the advertisement display unit 17 displays a full view spherical image, captured by the selected full view spherical camera 20, in a region 604 on the Web page.

When the Web page is scrolled, the advertisement display unit 17 switches the full view spherical image displayed in the region 604 to another full view spherical image captured by the full view spherical camera 20. In this configuration, the full view spherical images captured at various locations can be displayed, and thereby the viewer person can recognize that the full view spherical images captured at different locations can be displayed by scrolling the Web page.

(When Full View Spherical Image is Movie Image)

When a full view spherical image is a movie image, the advertisement display unit 17 can play the full view spherical image by using a fast-forwarding mode or a rewinding mode in response to a user operation on a Web page.

Figure 18:
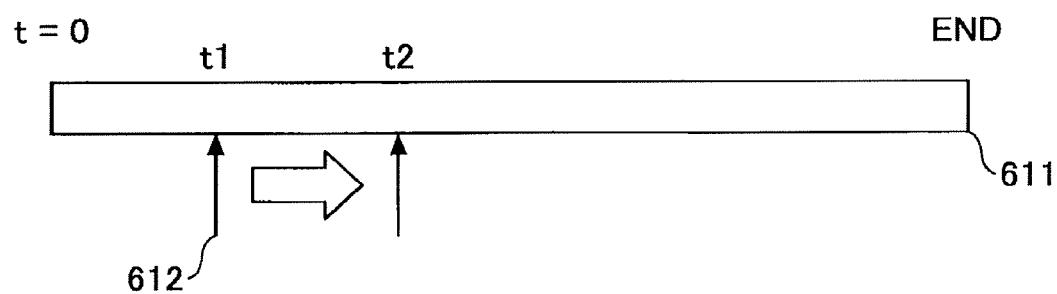
FIG. 18 illustrates a relationship of a user operation on a Web page and playing of a movie image.

FIG. 18 illustrates a relationship of a user operation on the Web page and playing of the movie image. In an example case of FIG. 18, a total play time 611 is a time for playing the movie image entirely, and an arrow 612 indicates the current play time t1. It is assumed that the advertisement display unit 17 plays the full view spherical image at the current play time t1 with respect to the total play time 611. When the Web page is scrolled to the downward direction at the current play time t1, the advertisement display unit 17 plays the movie image with the fast-forwarding mode based on the scroll length. For example, when the fast-forwarding mode is performed only when the Web page is being scrolled, the time length of fast-forwarding mode is set based on the scroll length, and the advertisement display unit 17 plays the movie image at a play time t2 that corresponds to the time length of fast-forwarding mode counted from the current play time t1. Further, when the fast-forwarding mode is performed continuously after the scroll operation is ended, the time length of fast-forwarding mode can be set based on the scroll length, and the advertisement display unit 17 plays the movie image corresponding to the time length of the fast-forwarding mode with, for example, a speed of two times of a normal speed.

Further, the gaze direction can be maintained in the initial state, or the gaze direction can be changed when performing the fast-forwarding mode. Further, the rewinding mode of the movie image can be similarly performed. Further, the fast-forwarding mode and the rewinding mode can be switched depending on the scroll directions, or any one of the fast-forwarding mode and the rewinding mode can be performed constantly when the scroll operation is performed along any scroll directions.

(When Web Page Includes a Plurality of Full View Spherical Images)

Figure 19A:
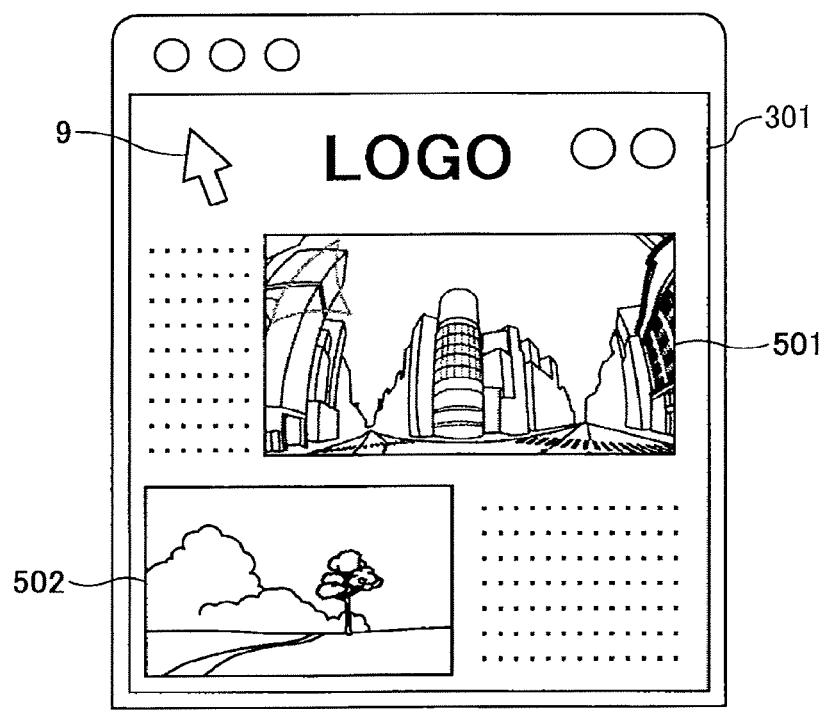
FIGS. 19A and 19B illustrate an example of a Web page including a plurality of full view spherical images.
Figure 19B:
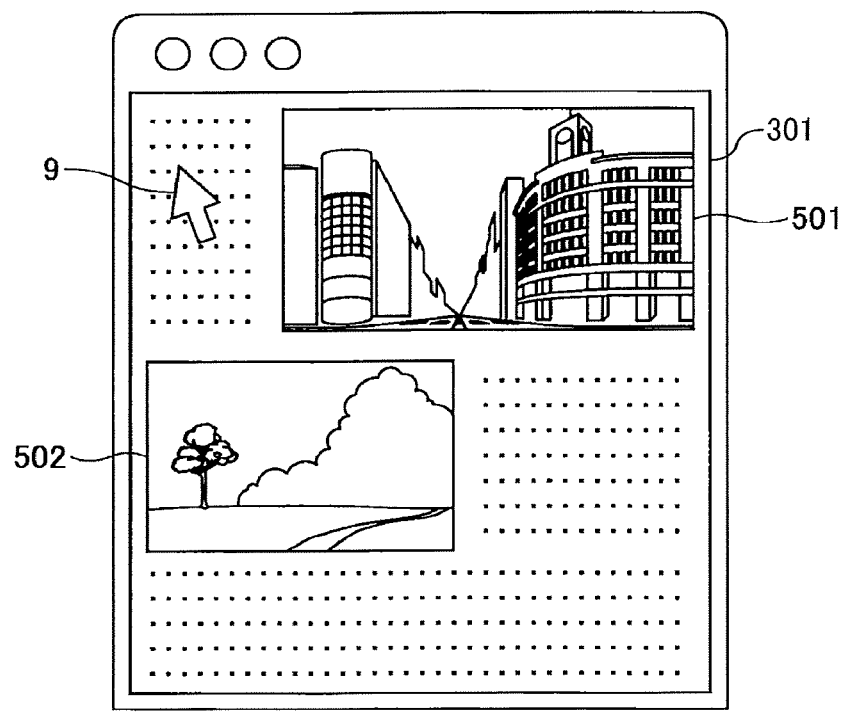

FIGS. 19A and 19B (FIG. 19) illustrate an example of a Web page including a plurality of full view spherical images. In this example case, when the Web page is operated, the advertisement display unit 17 reflects a user operation on the Web page to the presentation style of each one of the full view spherical images respectively. In an example case of FIG. 19A, two full view spherical images 501 and 502 are displayed on a Web page. When the Web page of FIG. 19A is scrolled, as illustrated in FIG. 19B, the advertisement display unit 17 rotates each of the full view spherical images 501 and 502 respectively. In an example case of FIG. 19, since the plurality of full view spherical images is rotated, the viewer person can easily recognize that each image is the full view spherical image.

(Operation on Web Page and Effect to Presentation Style of Full View Spherical Image)

The above-described user operation performed on the Web page and the effect of the user operation to the presentation style of the full view spherical image can be combined with various patterns. In the above described configuration, the contents of the user operation on the Web page are associated with the effect of the user operation to the presentation style of the full view spherical image as a table. An example of the table is illustrated as Table 1.

TABLE 1

| User operation on Web page | Effect to presentation style of full view spherical image |
|---|---|
| scroll to upward and downward | rotation along horizontal direction |
| scroll to left and right | rotation along vertical direction |
| left click | enlargement |
| right click | reduction |

Table 1 illustrates an example of the relationship of the contents of user operation on the Web page and the effect of the user operation to the presentation style of the full view spherical image. The advertisement display unit 17 changes the presentation style of the full view spherical image by applying Table 1 associating the user operation, receiveable by the operation receiving unit 14, and the effect of the user operation to the presentation style of the full view spherical image. With this configuration, the presentation style of the full view spherical image can be changed with various patterns depending on types of the user operation performed on the Web page by the viewer person, and thereby the viewer person can easily recognize that the image is the full view spherical image.

(Completion of Reflection to Presentation Style of Full View Spherical Image)

It is preferable that a viewer person can optionally stop the reflection of the user operation on the Web page to the presentation style of the full view spherical image. When the viewer person is aware of the full view spherical image or not aware of the full view spherical image, the viewer person may feel annoying that the user operation on the Web page unintentionally causes the rotation of the full view spherical image. Therefore, a stop button 621 is provided to the full view spherical image displayed on the Web page in the embodiment.

Figure 20:
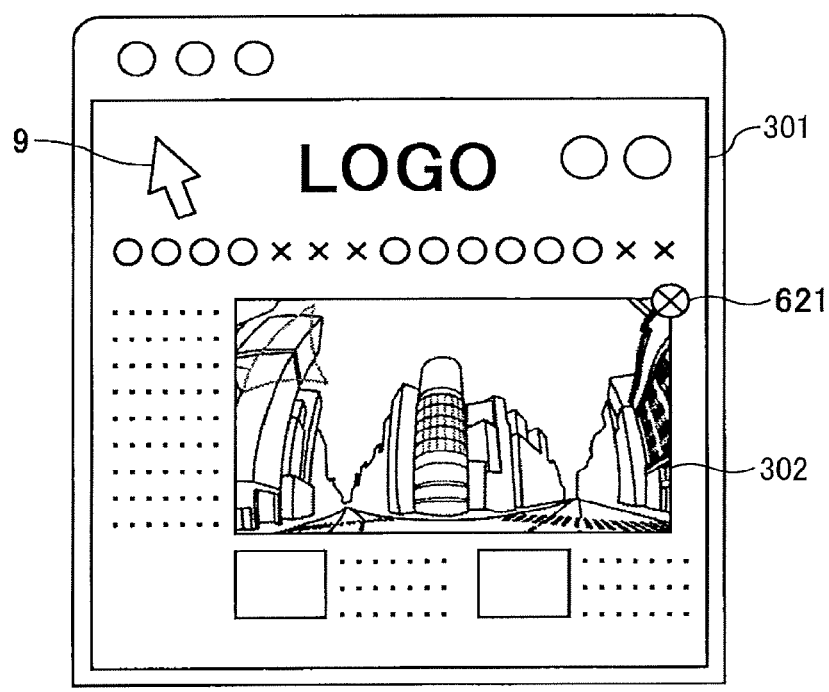
FIG. 20 is an example of a full view spherical image displaying a stop button.

FIG. 20 is an example of a full view spherical image displaying the stop button 621. In an example case of FIG. 20, the stop button 621 can be displayed, for example, at the upper right corner of the full view spherical image. When the viewer person presses the stop button 621, the operation receiving unit 14 receives a signal corresponding to the press operation, and then the advertisement display unit 17 stops or suspends the reflection of the user operation to the presentation style of the full view spherical image even when the Web page is operated. With this configuration, the viewer person can end the reflection of the user operation on the Web to the full view spherical image at any time.

As described above, as to the browsing system 100 of the embodiment, when the viewer person operates the Web page, the user operation is reflected on the presentation style of the full view spherical image, in which a motion not intended by the viewer person occurs to the full view spherical image displayed on the Web page, and thereby the gaze direction of the viewer person can be easily guided to the region image 302. Therefore, the probability that the viewer person recognizes that the image in the region image 302 is the full view spherical image becomes higher.

Conventionally, even when a wide angle image is included in the screen-configuring information distributed by a Web server, a user such as a viewer person may not recognize the wide angle image as the wide angle image. Typically, since the wide angle image is displayed on the Web page same as a normal angle image, it is difficult for the user to recognize whether an image displayed on the Web page is the wide angle image or the normal angle image. Therefore, the wide angle image may not be distinguished from other contents on the Web page, and thereby the wide angle image may not be recognized as the wide angle image by the user. As to one or more of the above described embodiments of the present invention, the information processing apparatus can display a screen that is easy to recognize the presentation image such as the wide angle image, in which a user of the information processing apparatus can obtain more information than the normal angle image, and the contents of the screen can be appealed to the user more effectively.

(Other Applications)

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of present disclosure and appended claims.

For example, in the above described embodiment, the information processing apparatus 10 acquires the Web page from the Web server 30, and the advertisement from the advertisement server 40, but the full view spherical image can be included in the Web page in advance. Further, the full view spherical image is not required to be used for the advertisement. Further, the above described embodiment can be applied to a case that the full view spherical image is displayed by using a general application software instead of the Web page.

Further, when the reflection to the presentation style of an image is the rotation, the image arranged on the Web page is preferably a full view spherical image. However, when the enlargement/reduction and the switching are reflected to the presentation style of an image, the image arranged on the Web page is not required to be the full view spherical image. The above described embodiment can be applied to any image that is used to attract the viewer person.

Further, in the above described embodiment, the information processing apparatus 10 determines whether the coordinates of the operable unit overlaps with the full view spherical image, but this determination can be performed by a server such as the Web server 30 or the advertisement server 40. In this case, the information processing apparatus 10 transmits the coordinates of the operable unit and the scroll length to the server, and receives the determination result from the server.

Further, in the above described embodiment, the full view spherical image is used for a preview of a real estate, but the contents included in the full view spherical image and a use field of the full view spherical image is not limited thereto. For example, the full view spherical image can be used in various fields such as public relations (PR) of sightseeing sites, interior of cars, structure guidance of machines, and description of locations where a person hardly enters.

Further, in the above described embodiment, the full view spherical image of 360 degrees captured around the full view spherical camera is arranged in the Web page, but not limited thereto. The image data of the Web page can be a wide angle image. In the embodiment, the wide angle image means an image having a portion that cannot be displayed in the advertisement space. For example, a panoramic image having an angle of view equal to 180 degrees or so alone along the horizontal direction can be used as the wide angle image.

Further, in the above described embodiment, the full view spherical image is generated by combining two images, but not limited thereto. For example, the full view spherical image can generated by overlapping portions of image data captured by slightly shifting the capturing directions. That is, the method of generating the full view spherical image is not limited to any specific method.

Further, appearances of the first region in which the spherical image is displayed, and the second region other than the first region in the screen are not limited to the above-described examples. The first region and the second region may be displayed in various other forms, layouts, shapes, etc.

Further, with the spherical image, any information regarding advertisements may be displayed, which may include, for example, information associated with a given person, place, or business. Further, the advisements may be event advertisements or personal advisements.

Further, the advertisements, or the image to be used for advertisements, do not have to be distributed as a Web page, but using any other means, such as using any known social network services.

In any one of the above-described embodiments, a touch on the display surface either by the pointer (such as the mouse) or the user's finger is detected as the user operation on the screen. Alternatively, the user's line of sight may be used, as the user operation on the screen. For example, if the viewpoint of the user is directed to the second region other than the first region where the spherical image is displayed, the information processing apparatus determines that the user may not recognize the spherical image or does not pay any attention. In such case, the information processing apparatus causes a presentation style of the spherical image to change to reflect the user operation on the screen.

Further, the change in position of the information processing apparatus may be also used as the user operation to cause the change in the presentation style of the image displayed in the screen. For example, when a user moves or changes an orientation of the information processing apparatus including a display, for example, with his or her hand holding the information processing apparatus, the change in position of the information processing apparatus can cause the presentation style of the image being displayed in the screen to change. The change in position of the information processing apparatus can be detected by a sensor such as gyroscope sensor, accelerator sensor or the like disposed for the information processing apparatus including the display.

Further, the configuration of FIG. 5 is divided into various functions in order to facilitate the understanding of processing by the information processing apparatus 10, the Web server 30, and the advertisement server 40. The configuration of dividing various functions and names of processing units is not limited to the above example configuration. The processing in the information processing apparatus 10, the Web server 30, and the advertisement server 40 can be further divided into more processing units in accordance with the processing contents. Further, the processing in the information processing apparatus 10, the Web server 30, and the advertisement server 40 can be divided by including more processes in one processing unit.

Further, in the above described embodiment, the operation receiving unit 14 is an example of the operation receiving unit that receives a signal corresponding to the user operation, the Web page display unit 13 is an example of a screen image display unit, and the advertisement display unit 17 is an example of an image processing unit.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described information processing method performable in the information processing apparatus can be described as a computer-executable program, and the computer-executable program can be stored in a ROM or the like in the information processing apparatus and executed by the information processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

What is claimed is:

1. An information processing apparatus, comprising:
circuitry configured to
receive a signal indicating that a user operation is performed on a screen having a first region including an image and a second region that does not include the image, the screen being displayed on a display at a time when only a first portion of the image is being displayed in the first region;
determine whether the user operation was performed on the first region that includes the image or on the second region that does not include the image;
when the circuitry determines that the user operation was performed on the first region that includes the image, analyze the contents of the user operation, and perform processing corresponding to the contents of the operation; and
when the user operation is an input of characters into the second region and the circuitry determines that the user operation was performed on the second region that does not include the image, change the display portion of the image from the first portion of the image to a second portion of the image based on a number of characters input into the second region and a type of each character input into the second region, the second portion encompassing a different portion of the image than the first portion, and update a display status of an entirety of the screen, including the first and second regions, based on the received signal corresponding to the user operation performed on the screen.

2. The information processing apparatus of claim 1, wherein
when coordinates of an operable unit operated on the screen overlaps with the first region, the circuitry is further configured to change a presentation style of the image in the first region based on the user operation caused by the operable unit on the first region, and
when the coordinates of the operable unit operated on the screen does not overlap with the first region but overlaps with the second region, the circuitry is further configured to change the presentation style of the image in the first region based on the user operation caused by the operable unit on the second region.

3. The information processing apparatus of claim 2, wherein
when the coordinates of the operable unit operated on the screen overlaps with the first region, the circuitry is further configured to change the presentation style of the image in the first region by applying a first mode, and when the coordinates of the operable unit operated on the screen does not overlap with the first region, but overlaps with the second region, the circuitry is further configured to change the presentation style of the image in the first region by applying a second mode, which is different from the first mode.

4. The information processing apparatus of claim 1, wherein
the image is a wide angle image and the user operation is a scroll operation, and
when the scroll operation is performed on the second region that does not include the image, the circuitry is further configured to display the second portion of the image, which was not displayed on the screen before receiving the scroll operation by rotating the wide angle image, in addition to scrolling both the first and second regions of the screen in response to the scroll operation.

5. The information processing apparatus of claim 1, wherein
the user operation performed on the second region that does not include the image is at least one of a scroll operation on the screen, a clicking operation on the screen, a double clicking operation on the screen, a dragging operation on the screen, a tapping operation on the screen, a sliding operation on the screen, a pinching-out operation on the screen, and a pinching-in operation on the screen, and
when the circuitry detects the user operation performed on the second region in the screen, the circuitry is further configured to change a presentation style of the image displayed on the display, based on the user operation performed on the second region that does not include the image.

6. The information processing apparatus of claim 1, wherein the circuitry is further configured to rotate the image, enlarge the image in size, reduce the image in size, or switch one image to another image based on the user operation performed on the second region that does not include the image.

7. The information processing apparatus of claim 1, wherein when the image is a movie image and the user operation is performed on the second region that does not include the movie image, the circuitry is further configured to play the movie image with a fast-forwarding mode or a rewinding mode based on the user operation performed on the second region that does not include the movie image.

8. The information processing apparatus of claim 1, wherein when the first region includes a plurality of images as the image, the circuitry is further configured to change a presentation style of each one of the plurality of the images displayed on the display, based on the user operation performed on the second region that does not include the image.

9. The information processing apparatus of claim 1, wherein when the circuitry receives a signal indicating that an operation to instruct suspension of changing a presentation style of the image is performed on the screen, the circuitry is further configured to suspend the changing of the presentation style of the image, even when the user operation is performed on the second region.

10. The information processing apparatus of claim 1, wherein the circuitry is further configured to change a presentation style of the image based on the user operation performed on the second region that does not include the image, only when the image is displayed on the display and the user operation is performed on the second region.

11. A system comprising:
the information processing apparatus of claim 1, and
at least one server configured to transmit information to be used for displaying the screen at the information processing apparatus.

12. The information processing apparatus of claim 1, wherein
the screen displays a first web page,
the image included in the first region is embedded in the first web page, and
the circuitry determines whether the user operation was performed on the image embedded in the web page.

13. The information processing apparatus of claim 12, wherein
the image is a web advertisement, and
the circuitry is further configured to execute instructions to activate a web browser so that the screen displays the first web page in the web browser.

14. The information processing apparatus of claim 12, wherein the image is an omnidirectional image.

15. The information processing apparatus of claim 1, wherein
in a case that the contents of the operation indicate to activate the image, the circuitry performs the processing by activating a link corresponding to the image and replacing the first region and the second region with a web page corresponding to the link, and
in a case that the contents of the operation indicate to increase a size of the image, the circuitry performs the processing by increasing a size of the image to fill the screen with the image.

16. A method of displaying an image, the method comprising:
displaying a screen including a first region in which an image is displayed, and a second region that does not include the image at a time when only a first portion of the image is being displayed in the first region;
in response to a user operation performed on the screen, determining whether the user operation is performed on the first region that includes the image, or the second region that does not include the image;
when determining that the user operation was performed on the first region that includes the image, analyzing the contents of the user operation, and performing processing corresponding to the contents of the operation; and
when the user operation is an input of characters into the second region and the determining indicates that that the user operation was performed on the second region that does not include the image, changing the display portion of the image from the first portion of the image to a second portion of the image based on a number of characters input into the second region and a type of each character input into the second region, the second portion encompassing a different portion of the image than the first portion, and updating a display status of an entirety of the screen, including the first and second regions, based on the user operation performed on the screen.

17. The method of claim 16, further comprising:
changing a presentation style of the image in the first region according to the user operation, based on a determination that the user operation is performed on the first region.

18. The method of claim 17, wherein the presentation style of the image is changed to reflect the user operation, based on the determination that the user operation is performed on the second region that does not include the image.

19. The method of claim 18, wherein the presentation style of the image that is changed when the user operation is performed on the first region, and the presentation style of the image that is changed when the user operation is performed on the second region are different.

20. A non-transitory storage medium storing one or more instructions that, when executed by one or more processors, cause the one or more processors to execute a method of a method of displaying an image, the method comprising:
displaying a screen including a first region in which an image is displayed, and a second region that does not include the image at a time when only a first portion of the image is being displayed in the first region;
in response to a user operation performed on the screen, determining whether the user operation is performed on the first region that includes the image or the second region that does not include the image;
when determining that the user operation was performed on the first region that includes the image, analyzing the contents of the user operation, and performing processing corresponding to the contents of the operation; and
when the user operation is an input of characters into the second region and the determining indicates that the user operation was performed on the second region that does not include the image, changing display portion of the image from the first portion of the image to a second portion of the image based on a number of characters input into the second region and a type of each character input into the second region, the second portion encompassing a different portion of the image than the first portion, and updating a display status of an entirety of the screen, including the first and second regions, based on the user operation performed on the screen.

* * * * *